(12) United States Patent
Kwon et al.

(10) Patent No.: US 12,094,393 B2
(45) Date of Patent: Sep. 17, 2024

(54) FOLDABLE ELECTRONIC DEVICE AND OPERATION METHOD FOR SAME

(71) Applicant: Samsung Electronics Co., Ltd., Suwon-si (KR)

(72) Inventors: Yongjin Kwon, Suwon-si (KR); Jeongwon Yang, Suwon-si (KR); Byungseok Jung, Suwon-si (KR); Seonghoon Choi, Suwon-si (KR); Jongwu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 293 days.

(21) Appl. No.: 17/428,483

(22) PCT Filed: Mar. 18, 2020

(86) PCT No.: PCT/KR2020/003705
§ 371 (c)(1),
(2) Date: Aug. 4, 2021

(87) PCT Pub. No.: WO2020/218742
PCT Pub. Date: Oct. 29, 2020

(65) Prior Publication Data
US 2022/0122514 A1    Apr. 21, 2022

(30) Foreign Application Priority Data
Apr. 24, 2019    (KR) ................ 10-2019-0047653

(51) Int. Cl.
*G09G 3/20* (2006.01)
*G06F 1/16* (2006.01)
*G06F 3/14* (2006.01)

(52) U.S. Cl.
CPC ......... *G09G 3/2096* (2013.01); *G06F 1/1616* (2013.01); *G06F 1/1641* (2013.01);
(Continued)

(58) Field of Classification Search
None
See application file for complete search history.

(56) References Cited

U.S. PATENT DOCUMENTS 10,025,469 B2    7/2018    Yoon
10,061,479 B2    8/2018    Shigemitsu et al.
(Continued)

FOREIGN PATENT DOCUMENTS

CN    102855867 A    1/2013
CN    203102070 U    7/2013
(Continued)

OTHER PUBLICATIONS

Chinese Office Action dated Dec. 13, 2021, issued in Chinese Application No. 202080017408.3.
(Continued)

*Primary Examiner* — Kyle Zhai
(74) *Attorney, Agent, or Firm* — Jefferson IP Law, LLP

(57) ABSTRACT

An electronic device is provided. The electronic device includes a hinge structure, a first housing, a second housing, a first display, a second display, and a processor. The processor may be set to control the first display to display a first screen of a first application while in a folded state, the first screen corresponding to the first display, control the second display to display a transition screen when unfolding is detected, and control the second display to display a second screen in replacement of the transition screen upon the completion of at least one operation set to be performed in order to display the second screen, corresponding to the second display, of the first application.

14 Claims, 26 Drawing Sheets

(52) U.S. Cl.
CPC .......... *G06F 1/1652* (2013.01); *G06F 3/1446* (2013.01); *G09G 2340/0407* (2013.01); *G09G 2340/0442* (2013.01)

(56) References Cited

U.S. PATENT DOCUMENTS

| | | | |
|---|---|---|---|
| 10,142,579 | B2 | 11/2018 | Cho et al. |
| 10,664,010 | B2 | 5/2020 | Chung et al. |
| 2007/0222935 | A1 | 9/2007 | Belyaev |
| 2012/0194448 | A1 | 8/2012 | Rothkopf |
| 2013/0241801 | A1 | 9/2013 | Petrik et al. |
| 2014/0328041 | A1 | 11/2014 | Rothkopf et al. |
| 2015/0062097 | A1* | 3/2015 | Chung ................ H04M 1/0245 345/184 |
| 2015/0156143 | A1* | 6/2015 | Chopde ................ G06F 1/1692 715/752 |
| 2015/0331593 | A1 | 11/2015 | Lee et al. |
| 2015/0338888 | A1 | 11/2015 | Kim et al. |
| 2015/0378557 | A1 | 12/2015 | Jeong et al. |
| 2016/0026219 | A1 | 1/2016 | Kim et al. |
| 2016/0026381 | A1 | 1/2016 | Kim et al. |
| 2016/0085319 | A1* | 3/2016 | Kim ................ H04M 1/0268 345/156 |
| 2016/0313962 | A1 | 10/2016 | Kwon et al. |
| 2017/0003793 | A1 | 1/2017 | Gao et al. |
| 2017/0255442 | A1 | 9/2017 | Kim et al. |
| 2017/0293383 | A1 | 10/2017 | Lee et al. |
| 2018/0033360 | A1 | 2/2018 | Bae et al. |
| 2018/0039387 | A1 | 2/2018 | Cheong et al. |
| 2018/0286355 | A1 | 10/2018 | Kim et al. |
| 2018/0359350 | A1 | 12/2018 | Kim et al. |
| 2019/0028579 | A1 | 1/2019 | Cho et al. |
| 2019/0042066 | A1 | 2/2019 | Kim et al. |
| 2023/0236484 | A1* | 7/2023 | Banno ................ G03B 21/204 353/57 |

FOREIGN PATENT DOCUMENTS

| | | |
|---|---|---|
| CN | 103324453 A | 9/2013 |
| CN | 105452983 A | 3/2016 |
| CN | 105830422 A | 8/2016 |
| CN | 107589836 A | 1/2018 |
| CN | 108713185 A | 10/2018 |
| JP | 2014-145972 A | 8/2014 |
| JP | 2015-001855 A | 1/2015 |
| KR | 10-2015-0025290 A | 3/2015 |
| KR | 10-2015-0135038 A | 12/2015 |
| KR | 10-2015-0135060 A | 12/2015 |
| KR | 10-2016-0012779 A | 2/2016 |
| KR | 10-2016-0126942 A | 11/2016 |
| KR | 10-1718046 B1 | 3/2017 |
| KR | 10-2018-0134668 A | 12/2018 |
| RU | 2 318 230 C2 | 2/2008 |
| WO | 2015/178714 A1 | 11/2015 |

OTHER PUBLICATIONS

European Search Report dated Feb. 9, 2022, issued in European Application No. 20794063.6.
Russian Office Action dated Jun. 1, 2023, issued in Russian Federation Application No. 2021133867.
Indian Office Action dated Jun. 6, 2023, issued in Indian Application No. 202117052337.
Chinese Office Action dated Nov. 3, 2023, issued in Chinese Application No. 202210481337.3.
Japanese Office Action dated Mar. 5, 2024, issued in Japanese Application No. 2021-563415.
Korean Office Action dated May 3, 2024, issued in Korean Application No. 10-2019-0047653.
Chinese Office Action dated May 24, 2024, issued in Chinese Application No. 202210481337.3.
Indian Hearing Notice dated Jun. 7, 2024, issued in Indian Application No. 202117052337.

* cited by examiner

US 12,094,393 B2

FOLDABLE ELECTRONIC DEVICE AND OPERATION METHOD FOR SAME

CROSS-REFERENCE TO RELATED APPLICATION(S)

This application is a U.S. National Stage application under 35 U.S.C. § 371 of an International application number PCT/KR2020/003705, filed on Mar. 18, 2020, which is based on and claims priority of a Korean patent application number 10-2019-0047653, filed on Apr. 24, 2019, in the Korean Intellectual Property Office, the disclosure of which is incorporated by reference herein in its entirety.

BACKGROUND

1. Field

The disclosure relates to a foldable electronic device and a method of operating the same.

2. Description of Related Art

The term "electronic device" may mean a device, such as a home appliance, an electronic scheduler, a portable multimedia reproducer, a mobile communication terminal, a tablet PC, an image/sound device, a desktop PC, a laptop PC, or a vehicle navigation system, that performs a specific function according to a program installed therein. The above-mentioned electronic devices may output, for example, information stored therein as sound or an image. As the degree of integration of electronic devices has increased and super-high-speed and large-capacity RF communication has become popular, multiple functions have recently come to be provided in a single electronic device, such as a mobile communication terminal. For example, functions such as an entertainment function (e.g., a game function), a multimedia function (e.g., a music/video reproducing function), a communication and security function for mobile banking, a schedule management function, or an e-wallet function, are integrated in a single electronic device, in addition to a communication function. Such an electronic device has been miniaturized so that the user can conveniently carry the electronic device.

As mobile communication services extend to a multimedia service area, it has become possible for users to use multimedia services as well as voice calls or short messages through an electronic device. Electronic devices are increasingly equipped with wider displays so that users do not have any inconvenience in using multimedia services. In addition, foldable electronic devices in each of which a flexible display is disposed have been disclosed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below.

According to changing between a folded state and an unfolded state, a foldable electronic device may display a screen on a display (or a display area) of various sizes (or various resolutions). For example, the foldable electronic device may display a first screen of a specific application on a first display in the folded state, and then display a second screen different from the first screen of the specific application on a second display in the unfolded state. In this case, it is necessary for the foldable electronic device to redraw the second screen using a specific application. Due to the time required for redrawing, there is a possibility that the foldable electronic device may not be able to immediately provide the second screen when the state is changed. This reduces seamless user experience.

In a foldable electronic device according to various embodiments of the disclosure and a method of operating the same, when the state is changed, it is possible to display a transition screen while operations set for displaying a screen on a display on which the screen is to be displayed are being performed, and to display a corresponding screen in replacement of the transition screen when execution of the operations are completed.

Additional aspects will be set forth in part in the description which follows and, in part, will be apparent from the description, or may be learned by practice of the presented embodiments.

In accordance with an aspect of the disclosure, an electronic device is provided. The electronic device includes a hinge structure, a first housing connected to the hinge structure and including a first surface oriented in a first direction and a second surface oriented in a second direction opposite to the first direction, a second housing connected to the hinge structure and including a third surface that is oriented in a third direction, and a fourth surface that is oriented in a fourth direction opposite the third direction, wherein the second housing structure is configured to be folded with respect to the first housing by the hinge structure, a first display visible through at least a portion of the first surface of the first housing, a second display extending from the second surface to the fourth surface across the hinge structure, wherein at least a partial area corresponding to the hinge structure is flexible, and at least one processor, and the at least one processor may be configured to control, in the folded state, the first display to display a first screen of a first application corresponding to the first display, control the second display to display a transition screen based on detection of unfolding from the folded state to the unfolded state, and control the second display to display a second screen in replacement of the transition screen when it is detected that execution of at least one operation set to be performed to display the second screen of the first application corresponding to the second display is completed.

In accordance with another aspect of a disclosure, a method of operating the electronic device is provided. The method includes controlling, by the at least one processor and in the folded state, the first display to display a first screen of a first application corresponding to the first display, controlling, by the at least one processor, the second display to display a transition screen based on detection of unfolding from the folded state to the unfolded state, and controlling, by the at least one processor, the second display to display a second screen in replacement of the transition screen when it is detected that execution of at least one operation set to be performed to display the second screen of the first application corresponding to the second display is completed.

In accordance with another aspect of a disclosure, an electronic device is provided. The electronic device includes a hinge structure, a first housing connected to the hinge structure, a second housing connected to the hinge structure and folded with respect to the first housing by the hinge structure, a display extending from the first housing to the second housing across the hinge structure, wherein at least a partial area corresponding to the hinge structure is flexible, and at least one processor, and wherein the at least one processor may be configured to control, in the folded state, the display to display a first screen of a first application corresponding to the folded state on a first area of the display, control the display to display a transition screen based on detection of unfolding from the folded state to the unfolded state, and control the display to display a second screen in replacement of the transition screen when it is detected that execution of at least one operation set to be performed to display the second screen of the first application corresponding to the unfolded state is completed.

In accordance with another aspect of a disclosure, an electronic device is provided. The electronic device includes a hinge structure, a first housing connected to the hinge structure and including a first surface oriented in a first direction and a second surface oriented in a second direction opposite to the first direction, a second housing connected to the hinge structure and including a third surface that is oriented in a third direction, and a fourth surface that is oriented in a fourth direction opposite the third direction, the second housing structure being configured to be folded with respect to the first housing by the hinge structure, a first display visible through at least a portion of the first surface of the first housing, a second display extending from the second surface to the fourth surface across the hinge structure, wherein at least a partial area corresponding to the hinge structure is flexible, and a processor, and wherein the processor may be configured to control, in the unfolded state, the second display to display a second screen of a first application corresponding to the second display, control the first display to display a transition screen based on detection of folding from the unfolded state to the folded state, and control the first display to display the first screen in replacement of the transition screen when it is detected that execution of at least one operation set to be performed to display a first screen of the first application corresponding to the first display is completed.

In accordance with another aspect of a disclosure, a foldable electronic device that is capable of displaying a transition screen while operations set for displaying a screen on a display on which the screen is to be displayed are being performed when a state thereof is changed and capable of displaying a corresponding screen in replacement of the transition screen when execution of the operations is completed, and a method of operating the same is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
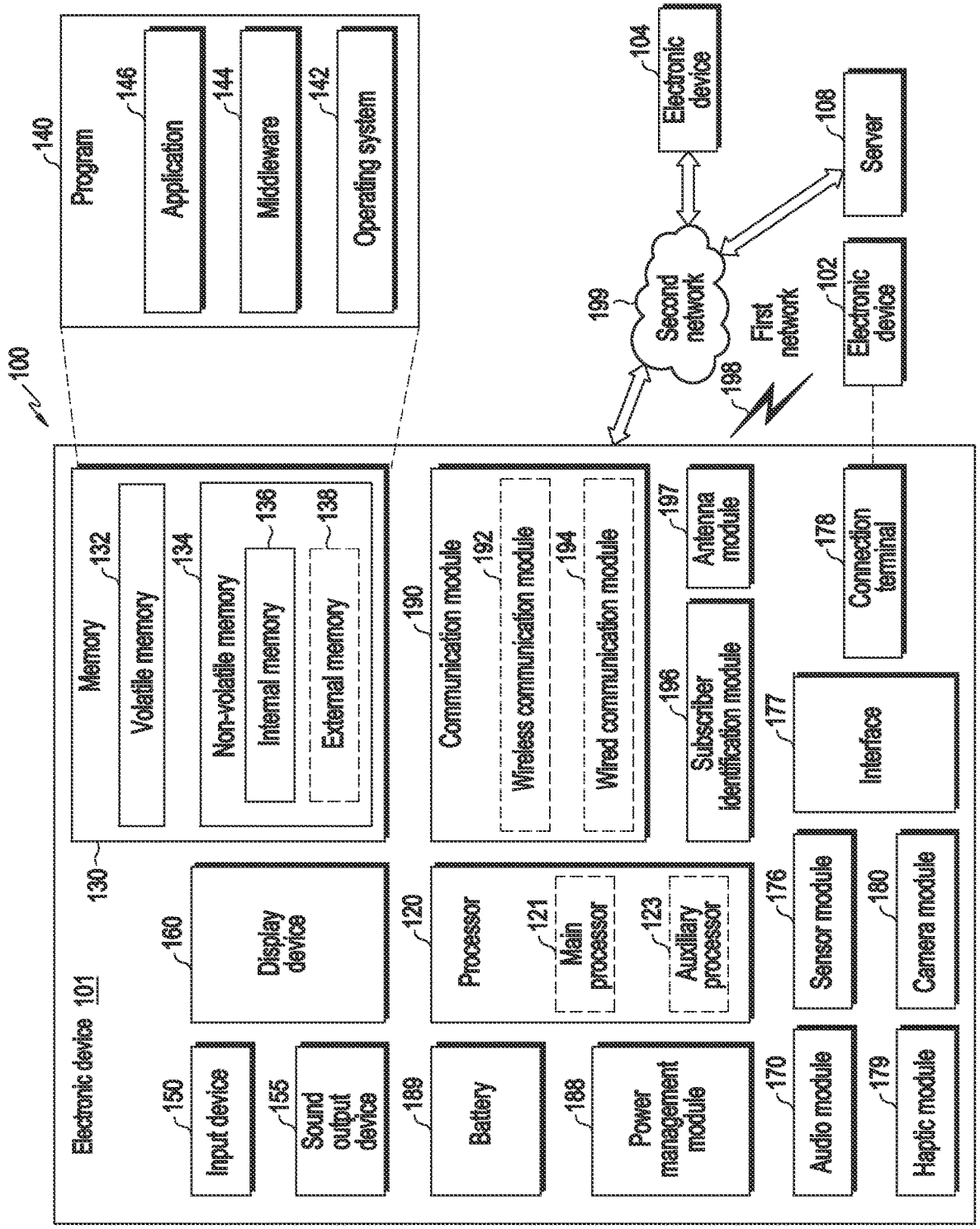
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, in replacement of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory may include internal memory 136 and external memory 138.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, in replacement of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
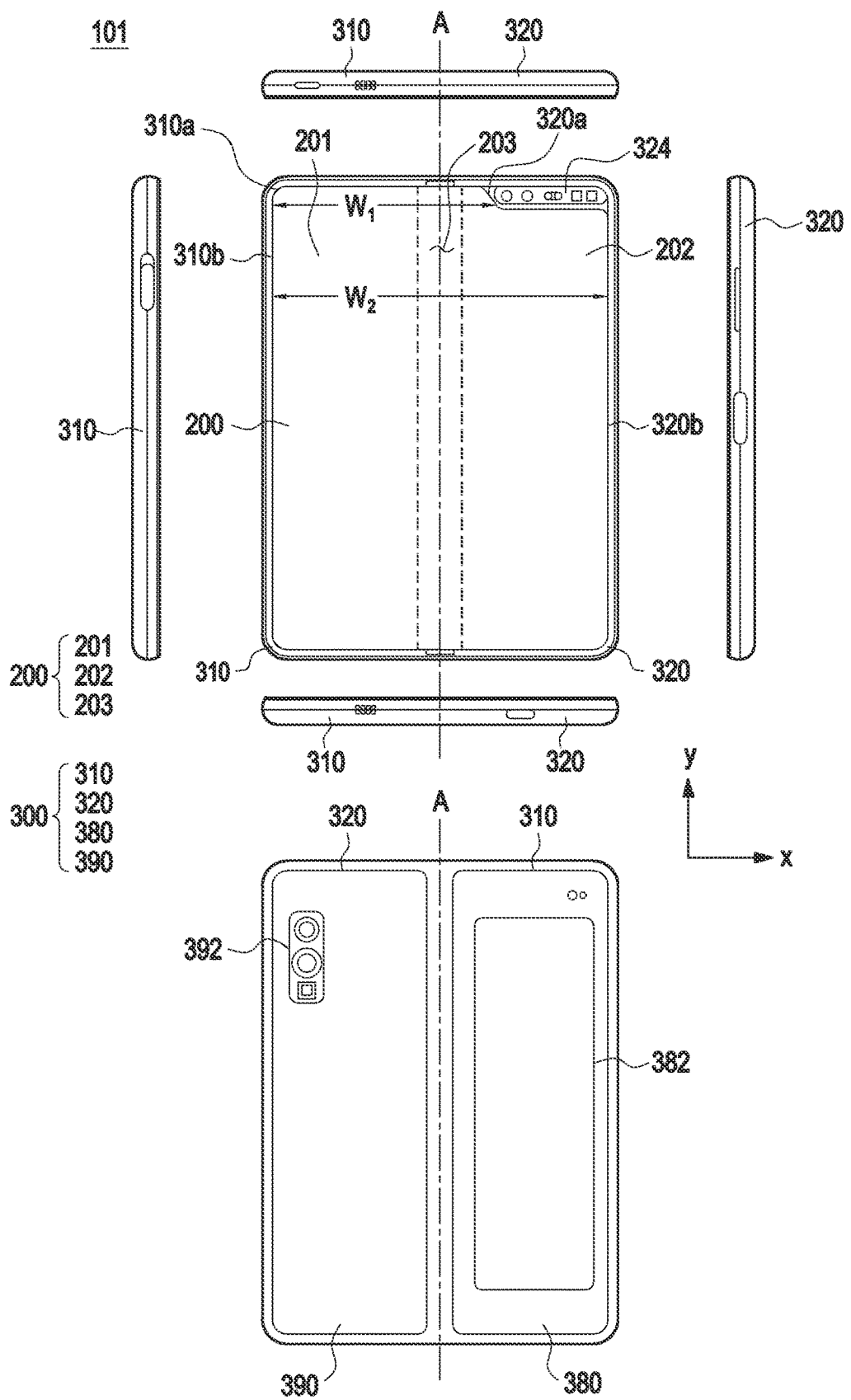
FIG. 2 is a view illustrating the state in which an electronic device is unfolded according to an embodiment of the disclosure.
Figure 3:
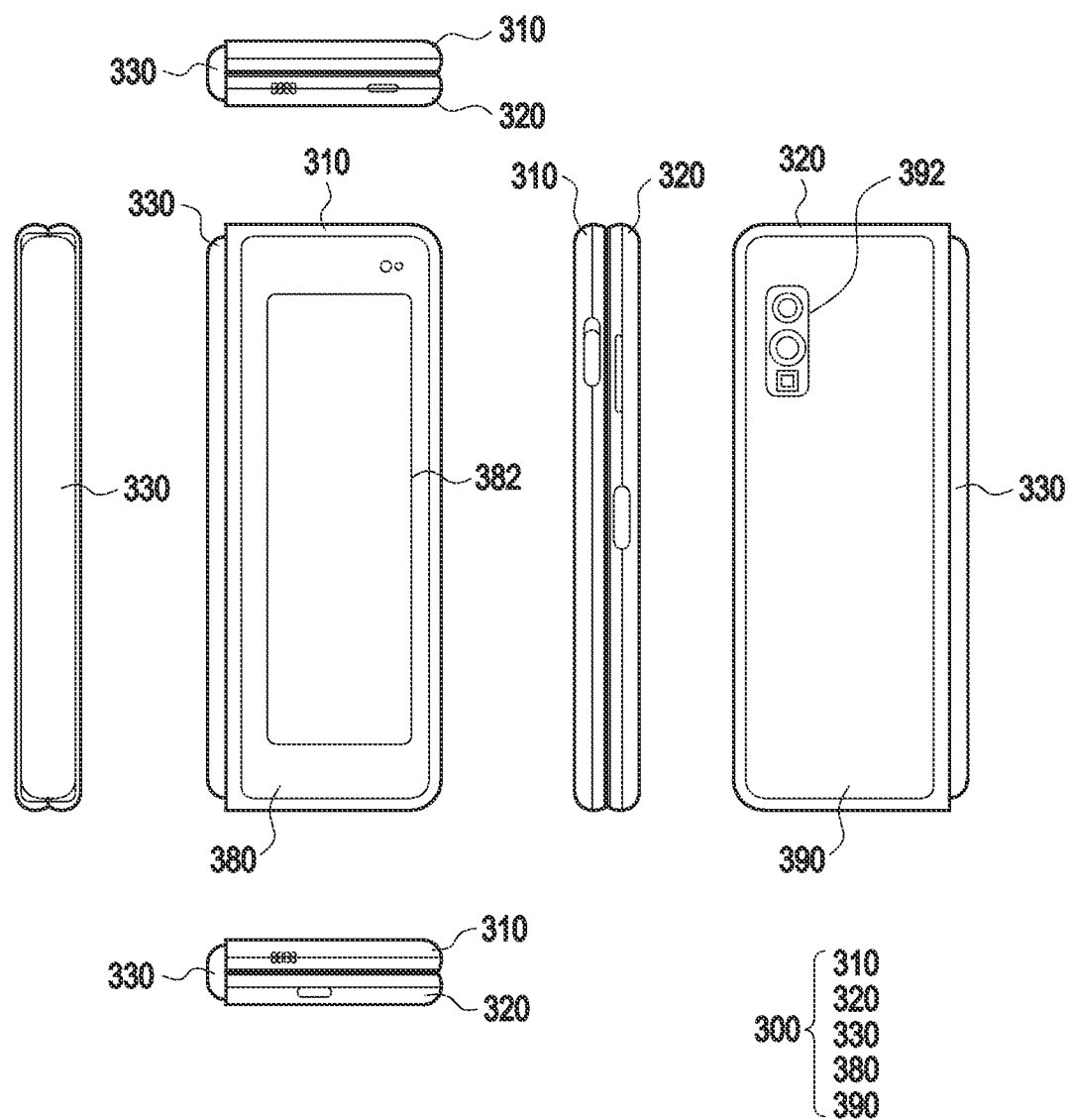
FIG. 3 is a view illustrating the state in which the electronic device is folded according to an embodiment of the disclosure.

FIG. 2 is a view illustrating the state in which an electronic device according to an embodiment of the disclosure is unfolded. FIG. 3 is a view illustrating the state in which the electronic device according to an embodiment of the disclosure is folded.

Referring to FIGS. 2 and 3, the electronic device 101 may include a foldable housing 300, a hinge cover 330 configured to cover the foldable portion of the foldable housing 300, and a flexible or foldable display 200 (hereinafter, simply referred to as a "display" 200) (e.g., the display device 160 in FIG. 1) disposed in the space defined by the foldable housing 300. The surface on which the display 200 is disposed (or the surface on which the display 200 is visible from the outside of the electronic device 101) may be defined as the front surface of the electronic device 101. The surface opposite to the front surface may be defined as the rear surface of the electronic device 101. The surface surrounding the space between the front surface and the rear surface may be defined as a side surface of the electronic device 101.

The foldable housing 300 may include a first housing structure 310, a second housing structure 320 including a sensor area 324, a first rear cover 380, a second rear cover 390, and a hinge structure (e.g., the hinge structure 510 in FIG. 4 to be described later). The foldable housing 300 of the electronic device 101 is not limited to the shape and assembly illustrated in FIGS. 2 and 3, but may be implemented by a combination and/or an assembly of different shapes or components. For example, the first housing structure 310 and the first rear cover 380 may be integrally configured, and the second housing structure 320 and the second rear cover 390 may be integrally configured.

The first housing structure 310 may be connected to a hinge structure (e.g., the hinge structure 510 to be described with reference to FIG. 4), and may include a first surface (e.g., the first surface 311 in FIG. 4 to be described later) oriented in a first direction and a second surface (e.g., the second surface 312 in FIG. 4 described below) oriented in a second direction opposite the first direction. The second housing structure 320 may be connected to the hinge structure 510, and may include a third surface (e.g., the third surface 321 in FIG. 4) oriented in a third direction and a fourth surface (e.g., the fourth surface 322 in FIG. 4 to be described later) oriented in a fourth direction opposite to the third direction, and the second housing structure 320 may be rotatable about the hinge structure 510 (or a hinge shaft 700) with respect to the first housing structure 310. The electronic device 101 may be changeable to a folded state or an unfolded state, which is described below with reference to FIG. 4. The direction may mean a direction parallel to a plane or a normal direction of a plane.

In the fully folded state of the electronic device 101, the first surface may face the third surface, and in the fully unfolded state, the third direction may be substantially the same as the first direction.

The first housing structure 310 and the second housing structure 320 may be disposed on opposite sides about the folding axis A, and may have a generally symmetrical shape with respect to the folding axis A. As is described below, the first housing structure 310 and the second housing structure 320 may form an angle or a distance therebetween, which may be variable depending on whether the electronic device 101 is in the unfolded state, in the folded state, or in the intermediate state in which the electronic device is partially unfolded (or partially folded). In contrast to the first housing structure 310, the second housing structure 320 may further include the sensor area 324 in which various sensors are disposed. However, the first housing structure 310 and the second housing structure 320 may have mutually symmetrical shapes in other areas.

As illustrated in FIG. 2, the first housing structure 310 and the second housing structure 320 may define a recess that accommodates the display 200 therein. Due to the sensor area 324, the recess may have two or more different widths in a direction perpendicular to the folding axis A.

The recess may have a first width $W_1$ between a first portion 310a of the first housing structure 310 parallel to the folding axis A and a first portion 320a of the second housing structure 320 disposed at an edge of the sensor area 324. The recess may have a second width $W_2$ defined by a second portion 310b of the first housing structure 310 and a second portion 320b of the second housing structure 320 that is parallel to the folding axis A but does not correspond to the sensor area 324. In this case, the second width $W_2$ may be greater than the first width $W_1$. As another example, the first portion 310a of the first housing structure 310 and the first portion 320a of the second housing structure 320, which are asymmetric to each other, may define the first width $W_1$ of the recess, and the second portion 310b of the first housing structure 310 and the second portion 320b of the second housing structure 320, which are symmetric to each other, may define the second width $W_2$ of the recess. The first portion 320a and the second portion 320b of the second housing structure 320 may have different distances from the folding axis A, respectively. The width of the recess is not limited to the illustrated example. The recess may also have multiple widths due to the shape of the sensor area 324 or due to the asymmetric portions of the first housing structure 310 and the second housing structure 320.

At least a portion of the first housing structure 310 and at least a portion of the second housing structure 320 may be made of a metal material or a non-metal material having rigidity of a level selected so as to support the display 200. The portion made of the metal material may provide a ground plane of the electronic device 101, and may be electrically connected to a ground line configured on a printed circuit board (e.g., the board unit 520 in FIG. 4).

The sensor area 324 may be configured to have a predetermined area adjacent to one corner of the second housing structure 320. However, the arrangement, shape, and size of the sensor area 324 are not limited to those in the illustrated example. For example, the sensor area 324 may be provided at another corner of the second housing structure 320 or in any area between the upper and lower end corners. Components embedded in the electronic device 101 to perform various functions may be exposed, i.e., visible to the front surface of the electronic device 101 through the sensor area 324 or one or more openings provided in the sensor area 324. In various embodiments, the components may include various types of sensors. The sensors may include at least one of a front camera, a receiver, or a proximity sensor.

The first rear cover 380 may be disposed at one side of the folding axis A on the rear surface of the electronic device 101, and may have a substantially rectangular periphery, which may be wrapped by the first housing structure 310. Similarly, the second rear cover 390 may be disposed at the other side of the folding axis A on the rear surface of the electronic device 101, and the periphery of the second rear cover 390 may be enclosed by the second housing structure 320.

The first rear cover 380 and the second rear cover 390 may have substantially symmetrical shapes about the folding axis A. However, the first rear cover 380 and the second rear cover 390 do not necessarily have mutually symmetrical shapes; for example, the electronic device 101 may include a first rear cover 380 and a second rear cover 390 having various shapes. The first rear cover 380 may be configured integrally with the first housing structure 310, and the second rear cover 390 may be configured integrally with the second housing structure 320.

The first rear cover 380, the second rear cover 390, the first housing structure 310, and the second housing structure 320 may define a space in which various components (e.g., a printed circuit board, or a battery) of the electronic device 101 may be disposed. One or more components may be disposed or visually exposed on the rear surface of the electronic device 101. For example, at least a portion of a sub-display may be visually exposed, i.e., visible through a first rear area 382 of the first rear cover 380. In another embodiment, one or more components or sensors may be visually exposed through the second rear area 392 of the second rear cover 390. The sensors may include a proximity sensor and/or a rear camera.

A front camera exposed to the front surface of the electronic device 101 through the one or more openings provided in the sensor area 324 or a rear camera exposed through the second rear area 392 of the second rear cover 390 may include one or more lenses, an image sensor, and/or an image signal processor. The flash may include a light-emitting diode or a xenon lamp. In some embodiments, two or more lenses (e.g., an infrared camera, a wide-angle lens, and a telephoto lens), and image sensors may be disposed on one surface of the electronic device 101.

Referring to FIG. 3, the hinge cover 330 may be disposed between the first housing structure 310 and the second housing structure 320 so as to cover internal components (e.g., the hinge structure 510 in FIG. 4 described below). The hinge cover 330 may be covered by a portion of the first housing structure 310 and a portion of the second housing structure 320, or may be exposed to the outside depending on the state of the electronic device 101 (the unfolded state, the intermediate state, or the folded state).

As illustrated in FIG. 2, when the electronic device 101 is in the unfolded state (e.g., the fully unfolded state), the hinge cover 330 may be covered by the first housing structure 310 and the second housing structure 320. As another example, as illustrated in FIG. 3, when the electronic device 101 is in the folded state (e.g., the fully folded state), the hinge cover 330 may be exposed to the outside between the first housing structure 310 and the second housing structure 320. When the first housing structure 310 and the second housing structure 320 are in the intermediate state in which the first housing structure 310 and the second housing structure 320 are folded to form a predetermined angle therebetween, a portion of the hinge cover 330 may be exposed to the outside between the first housing structure 310 and the second housing structure 320. In this case, however, the exposed area may be less than that in the fully folded state. The hinge cover 330 may include a curved surface.

The display 200 may be disposed on a space defined by the foldable housing 300. For example, the display 200 may be accommodated by the recess defined by the foldable housing 300, and may be visible to the outside through the front surface of the electronic device 101. The display 200 may constitute most of the front surface of the electronic device 101. Accordingly, the front surface of the electronic device 101 may include the display 200, and partial area of the first housing structure 310 and partial area of the second housing structure 320, which are adjacent to the display 200. In addition, the rear surface of the electronic device 101 may include the first rear cover 380, a partial area of the first housing structure 310 adjacent to the first rear cover 380, the second rear cover 390, and a partial area of the second housing structure 320 adjacent to the second rear cover 390.

The display 200 may include at least a partial area that is deformable into a flat surface or a curved surface. The display 200 may include a folding area 203, a first area 201 disposed at one side of the folding area 203 (e.g., the left side of the folding area 203 illustrated in FIG. 2), a second area 202 disposed at the other side of the folding area 203 (e.g., the right side of the folding area 203 illustrated in FIG. 2), and an area 240.

However, the area division of the display 200 illustrated in FIG. 2 is an one example, and the display 200 may be divided into multiple areas (e.g., more than five or, tree areas, or two areas) depending on the structure or function thereof. For example, in the embodiment illustrated in FIG. 2, the areas of the display 200 may be divided by the folding area 203 or the folding axis (the axis A) extending parallel to the y axis. However, in another embodiment of the disclosure, the areas of the display 200 may be divided on the basis of another folding area (e.g., a folding area parallel to the x axis) or another folding axis (e.g., a folding axis parallel to the x axis).

The first area 201 and the second area 202 may have generally symmetrical shapes about the folding area 203. However, unlike the first area 201, the second area 202 may include a notch cut due to the presence of the sensor area 324, but may have a shape symmetrical to the first area 201 in areas other than the sensor area. In other words, the first area 201 and the second area 202 may include portions having mutually symmetrical shapes and portions having mutually asymmetrical shapes.

The operations of the first housing structure 310 and the second housing structure 320 and respective areas of the display 200 according to the state of the electronic device 101 (e.g., the unfolded state, the folded state, or the intermediate state) are described below.

When the electronic device 101 is in the unfolded state (e.g., the state illustrated in FIG. 2), the first housing structure 310 and the second housing structure 320 may be disposed to form an angle of 180 degrees therebetween and to be oriented in the same direction. The surface of the first area 201 and the surface of the second area 202 of the display 200 form an angle of 180 degrees relative to each other, and may face the same direction (e.g., the front direction of the electronic device). The folding area 203 may form substantially same plane as the first area 201 and the second area 202.

When the electronic device 101 is in the folded state (e.g., the state illustrated in FIG. 3), the first housing structure 310 and the second housing structure 320 may be disposed to face each other. The surface of the first area 201 and the surface of the second area 202 of the display 200 may face each other while forming a narrow angle (e.g., an angle between 0 degrees and 10 degrees) relative to each other. At least a portion of the folding area 203 may be a curved surface having a predetermined curvature.

When the electronic device 101 is in the intermediate state, the first housing structure 310 and the second housing structure 320 may be disposed to form a certain angle relative to each other. The surface of the first area 201 and the surface of the second area 202 of the display 200 may form an angle larger than that in the folded state and smaller than that in the unfolded state. At least a portion of the folding area 203 may have a curved surface having a predetermined curvature, and the curvature at this time may be smaller than that in the folded state.

Figure 4:
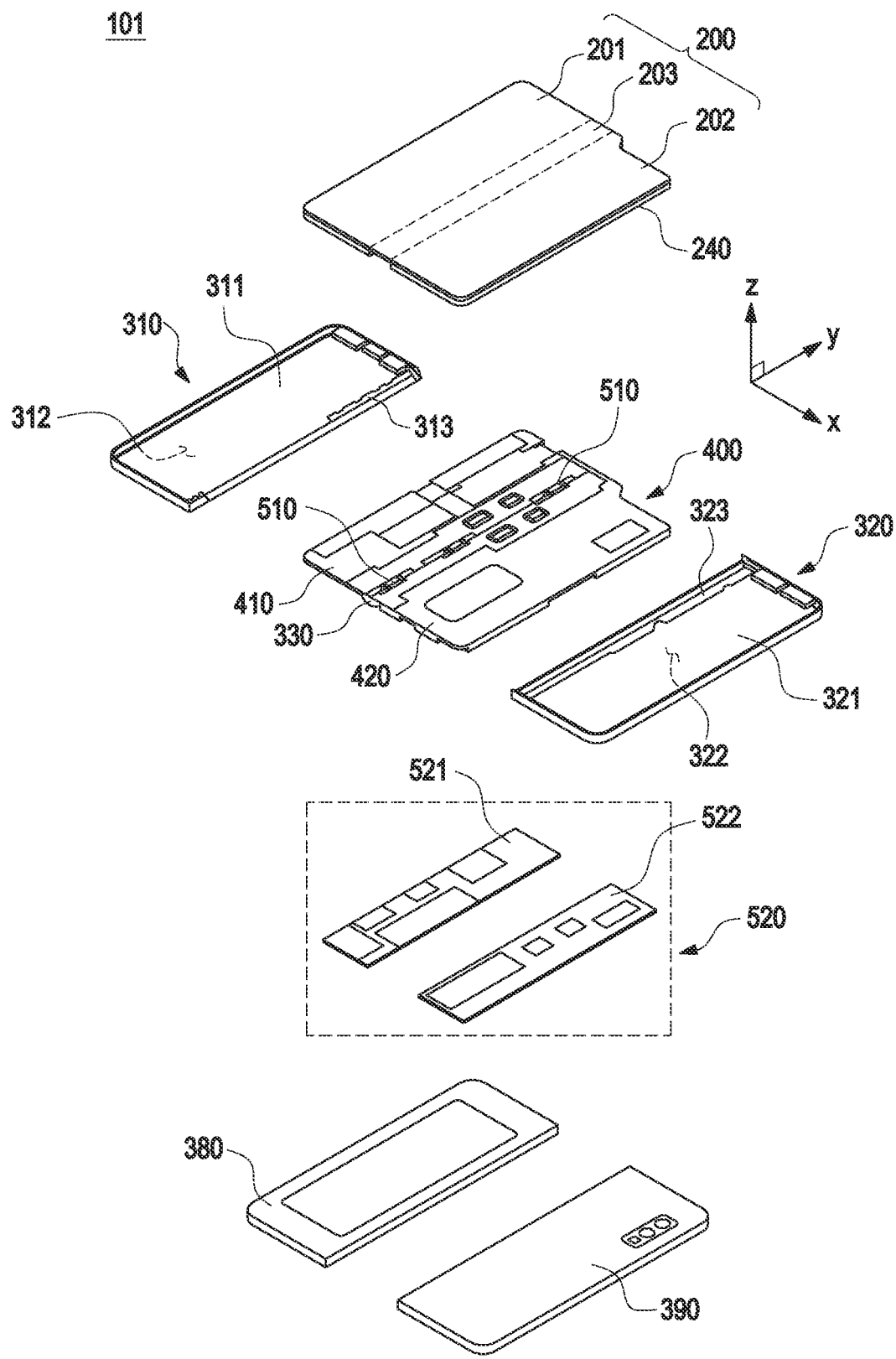
FIG. 4 is an exploded perspective view of an electronic device according to an embodiment of the disclosure.

FIG. 4 is an exploded perspective view of an electronic device according to an embodiment of the disclosure.

Referring to FIG. 4, the electronic device 101 may include a foldable housing 300, a display 200, and a board unit 520. The foldable housing may include a first housing structure 310, a second housing structure 320, a bracket assembly 400, a first rear cover 380, a second rear cover 390, and a hinge structure 510.

The display 200 may include a display panel (e.g., a flexible display panel) and one or more plates or layers by which the display panel is accommodated. The support plate may be disposed between the display panel and the bracket assembly 400. An adhesive structure (not illustrated) may be positioned between the support plate and the bracket assembly 400 to bond the support plate and the bracket assembly 400.

The bracket assembly 400 may include a first bracket assembly 410 and a second bracket assembly 420. The hinge structure 510 may be disposed between the first bracket assembly 410 and the second bracket assembly 420, and a hinge cover 330 may be disposed to cover the hinge structure 510 when the hinge structure 510 is viewed from the outside. A printed circuit board (e.g., a flexible printed circuit board (FPC)) may be disposed across the first bracket assembly 410 and the second bracket assembly 420.

The board unit 520 may include a first main circuit board 521 disposed at the first bracket assembly 410 side and a second main circuit board 522 disposed at the second bracket assembly 420 side. The first main circuit board 521 and the second main circuit board 522 may be disposed inside a space defined by the bracket assembly 400, the first housing structure 310, the second housing structure 320, the first rear cover 380, and the second rear cover 390. Components for implementing various functions of the electronic device 101 may be mounted on the first main circuit board 521 and the second main circuit board 522.

The first housing structure 310 and the second housing structure 320 may be assembled so as each to be coupled to each of sides of the bracket assembly 400 in the state in which the display 200 is coupled to the bracket assembly 400. For example, the first housing structure 310 and the second housing structure 320 may be coupled to the bracket assembly 400 by sliding on the each of sides of the bracket assembly 400.

The first housing structure 310 may include a first surface 311 and a second surface 312 facing opposite direction of the first surface 311, and the second housing structure 320 may include a third surface 321 and a fourth surface 322 facing opposite direction of the third surface 321. The first housing structure 310 may include a first rotation support surface 313, and the second housing structure 320 may include a second rotation support surface 323, which corresponds to the first rotation support structure 313. The first rotation support surface 313 and the second rotation support surface 323 may include curved surfaces corresponding to the curved surface included in the hinge cover 330.

When the electronic device 101 is in the unfolded state (e.g., the state illustrated in FIG. 2), the first rotation support surface 313 and the second rotation support surface 323 may cover the hinge cover 330 so that the hinge cover 330 may not be exposed to the rear surface of the electronic device 101 or may be exposed to a smallest amount of the rear surface of the electronic device 101. When the electronic device 101 is in the folded state (e.g., the state illustrated in FIG. 3), the first rotation support surface 313 and the second rotation support surface 323 may rotate along the curved surfaces included in the hinge cover 330 so that the hinge cover 330 may be exposed to the rear surface of the electronic device 101 as much as possible.

Figure 5:
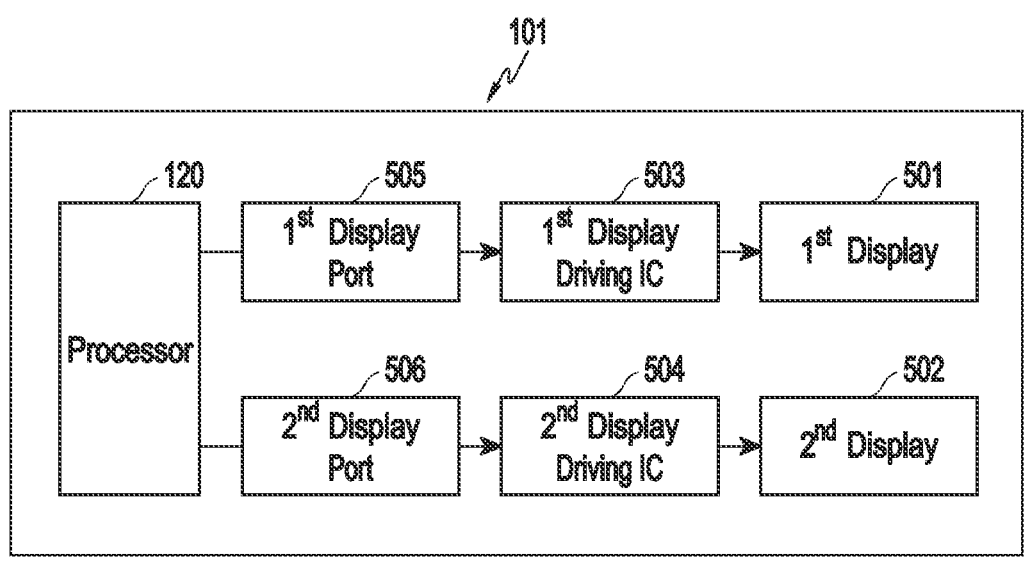
FIG. 5 is a block diagram of a foldable electronic device according to an embodiment of the disclosure.

FIG. 5 is a block diagram of a foldable electronic device according to an embodiment of the disclosure.

Referring to FIG. 5, the electronic device 101 may include a first display 501 and a second display 502. For example, the first display 501 may be exposed through the first rear cover 380 of the first housing structure 310 of FIG. 2. For example, the first display 501 may be exposed through the first rear area 382 of FIG. 2. The first display 501 may have a relatively small size compared to the second display 502 to be described later in more detail, and in this sense, may be referred to as a sub-display.

The second display 502 may be exposed to the outside in the state in which the electronic device 101 is unfolded. At least a portion of the second display 502 (e.g., a portion corresponding to the hinge) is flexible, and when the electronic device 101 is folded, the second display 502 may also be folded together. The second display 502 may be the flexible display 200 in FIG. 2, but will be referred to as a "second display" 502 in order to distinguish the second display 502 from the first display 501. As described above, the first area and the second area of the second display 502 may face each other in the folded state. The first area and the second area may be divided based on, for example, a boundary line included in the portion corresponding to the hinge. In addition, the first area and the second area of the second display 502 may form substantially the same plane in the unfolded state. The size of the second display 502 may be larger than that of the first display 501. The resolution of the second display 502 may be expressed as being higher than that of the first display 501.

While the electronic device 101 is folded, the processor 120 may transmit data for outputting a screen to the first display driving IC 503 through a first display port 505. The first display driving IC 503 may output a signal to a data line based on the received data while scanning a gate line of the first display 501. Accordingly, the first display 501 may display a screen. There is no limitation on the manner in which the first display driving IC 503 drives the first display 501.

While the electronic device 101 is unfolded, the processor 120 may transmit data for outputting a screen to the second display driving IC 504 through a second display port 506. The second display driving IC 504 may output a signal to a data line based on the received data while scanning a gate line of the second display 502. Accordingly, the second display 502 may display a screen. There is no limitation on the manner in which the second display driving IC 504 drives the second display 502. In the state in which the electronic device 101 is unfolded, the processor 120 may stop the operation of the first display driving IC 503. However, depending on the implementation, the processor 120 may control the first display driving IC 503 to operate. In this case, a screen may be displayed on the first display 501 even in the state in which the electronic device 101 is unfolded.

Referring to FIG. 5, the first display driving IC 503 and the second display driving IC 504 are illustrated as being implemented with different hardware, but this is merely an example. The first display driving IC 503 and the second display driving IC 504 may be implemented with different hardware, or may be implemented with a single IC. In addition, in various embodiments, each of the first display driving IC 503 and the second display driving IC 504 may be implemented with a touch and display driver IC (TDDI) that additionally supports a function of inputting electrical signals to a touch screen panel (TSP) or receiving and processing output signals to detect the position of a touch.

Figure 6:
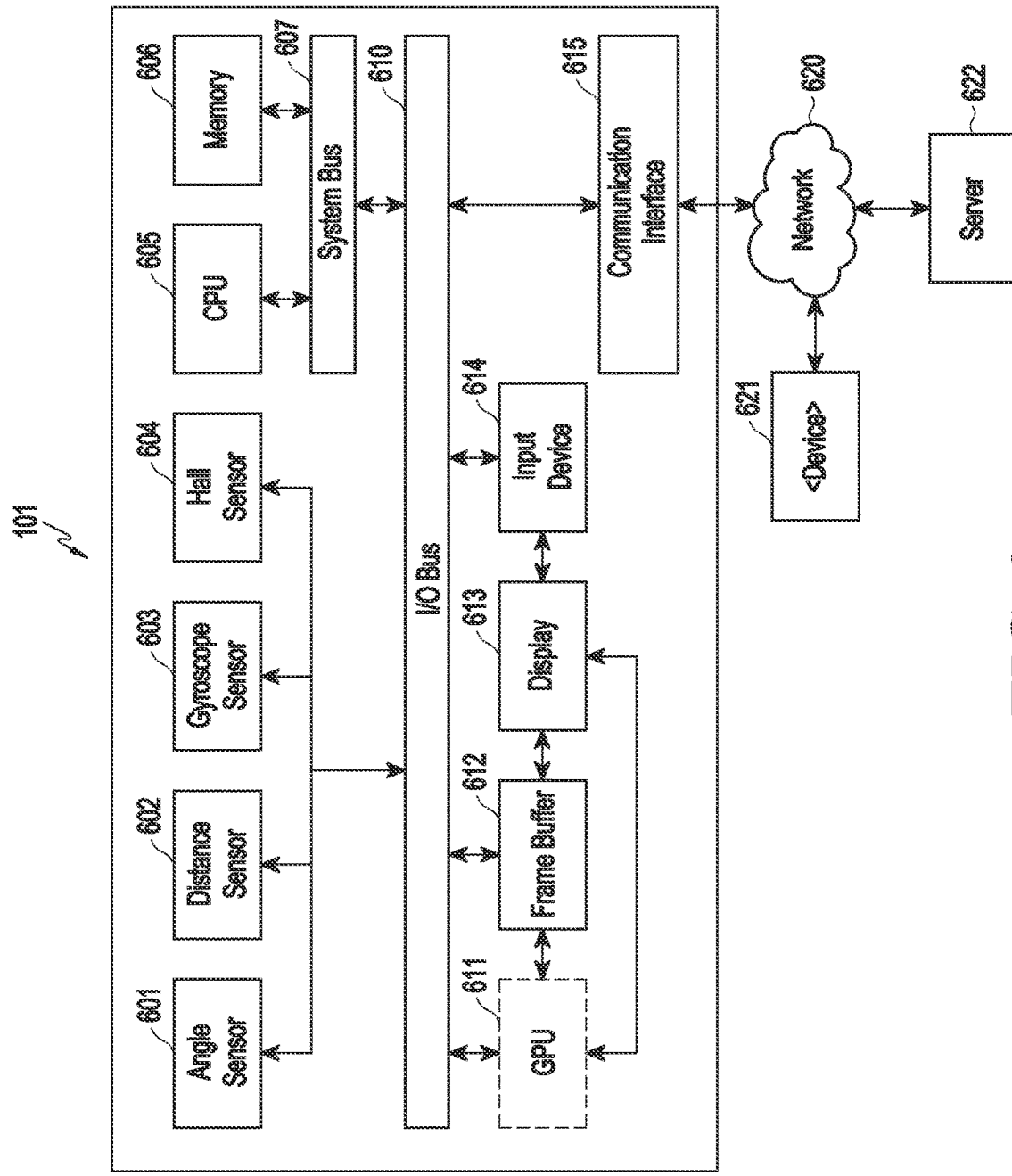
FIG. 6 is a block diagram of an electronic device according to an embodiment of the disclosure.

FIG. 6 is a block diagram of an electronic device according to an embodiment of the disclosure.

Referring to FIG. 6, the electronic device 101 may include at least one of an angle sensor 601, a distance sensor 602, a gyroscope sensor 603, a Hall sensor. 604, a CPU 605 (e.g., the processor 120 in FIG. 1), a memory 606 (e.g., the memory 130 in FIG. 1), a system bus 607, an input/output bus (an I/O bus) 610, a GPU 611, a frame buffer 612, a display 613, an input device 614 (e.g., the input device 150 in FIG. 1), or a communication interface 615 (e.g., the communication module 190 in FIG. 1).

At least one of the angle sensor 601, the distance sensor 602, the gyroscope sensor 603, or the Hall sensor 604 may be included in the sensor module 176 of FIG. 1. The angle sensor 601 may sense a parameter associated with an angle formed by the first housing structure 310 and the second housing structure 320 of the electronic device 101. For example, the first housing structure 310 and the second housing structure 320 may be folded by the hinge structure 510, and the angle sensor 601 may sense the degree of rotation of the hinge structure 510. The parameter sensed by the angle sensor 601 is not limited as long as the parameter is related to an angle formed by the first housing structure 310 and the second housing structure 320. The distance sensor 602 may sense a parameter associated with the distance between the first housing structure 310 and the second housing structure 320. The gyroscope sensor 603 may sense a parameter associated with the rotation or orientation of at least one of the first housing structure 310 or the second housing structure 320. The Hall sensor 604 may sense a parameter associated with whether the first housing structure 310 and the second housing structure 320 are in proximity. In addition to the parameters of the above-described sensors, sensors for sensing parameters related to whether the first housing structure 310 and the second housing structure 320 are folded or unfolded may be additionally (or alternatively) included in the electronic device 101.

The CPU 605 may receive sensing information through the input/output bus 610 and the system bus 607, and based on the sensing information, the CPU 605 may identify whether the electronic device 101 is in the folded state or the unfolded state. The CPU 605 may perform a predetermined operation based on whether the electronic device 101 is in the folded state or the unfolded state. For example, when the electronic device 101 is in the folded state, the CPU 605 may control at least one of the displays 613 (e.g., the first display 501) to display a screen, and the electronic device 101, when the electronic device 101 is in the unfolded state, the CPU 605 may control at least one of the other displays 613 (e.g., the second display 502) to display a screen. During a state change period, the CPU 605 may perform control such that a transition screen is displayed on a display configured to display a new screen, and then when configuration of a screen is completed, the configured screen is displayed in replacement of the transition screen. This operation is described below in more detail.

The GPU 611 may quickly and efficiently synthesize graphic information on the display 613. The GPU 611 may provide a separate instruction set for special effects and computation function for processing graphic elements. In the case in which the GPU 611 and the CPU 605 are used at the same time, when processing the same graphic element, it is possible to achieve faster processing than processing performed by the CPU 605 alone. Depending on implementation, the electronic device 101 may not include the GPU 611.

The memory 606 (e.g., the memory 130) may include at least one of a volatile memory or a nonvolatile memory, as described above, and may store instructions or data for screen configuration.

The frame buffer 612 may store pixel color values output through the display 613. The frame buffer 612 may be implemented as a memory in the GPU 611 or in a display device controller (e.g., DDI) for controlling the display 613. In terms of software, the frame buffer 612 may be implemented as a virtual device such as a frame buffer device of an operating system (e.g., Linux). In the frame buffer 612, data to be displayed on the display (e.g., data for a first screen, a redrawn screen, or a transition screen) may be stored and output to be used for screen display.

A description of the input device 614 (e.g., the input device 150 in FIG. 1) and the communication interface 615 (e.g., the communication module 190 in FIG. 1) have been described with reference to FIG. 1. Therefore, a detailed description thereof will be omitted herein. The communication interface 615 may communicate with a device 621 or a server 622 through a network 620 (e.g., at least one of the first network 198 or the second network 199).

At least one of the system bus 607 or the input/output bus 610 may be an interface for exchanging information between devices (or hardware) constituting the system, and may transmit/receive data, addresses, and control signals.

Figure 7A:
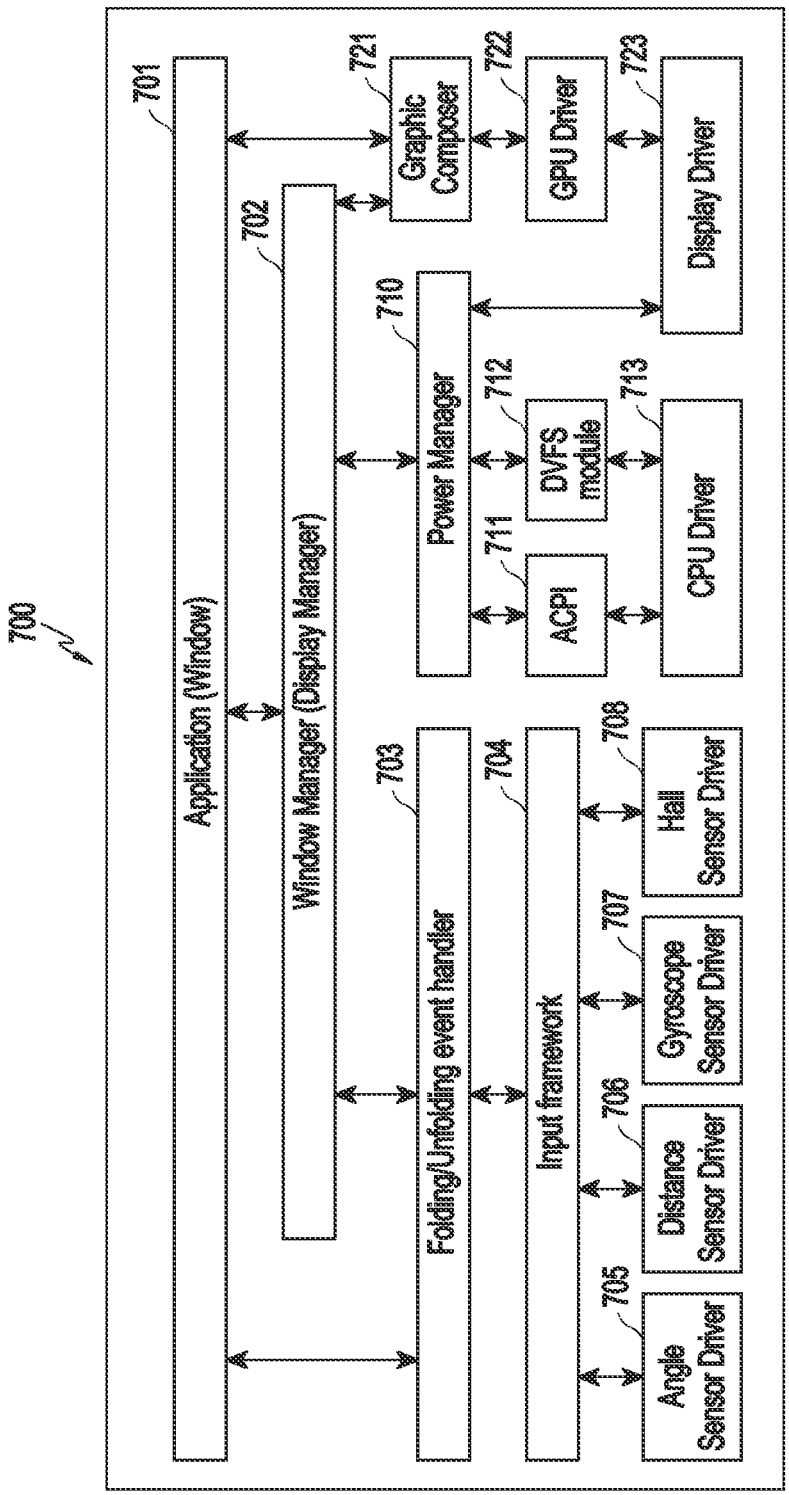
FIG. 7A is a view illustrating a configuration of a software module according to an embodiment of the disclosure.

FIG. 7A is a view illustrating a configuration of a software module according to an embodiment of the disclosure.

Referring to FIG. 7A, a software module 700 defined in the electronic device 101 may include at least one of an application (or window) 701, a window manager (or a display manager) 702, a folding/unfolding event handler 703, an input framework 704, an angle sensor driver 705, a distance sensor driver 706, a gyroscope sensor driver 707, a Hall sensor driver 708, a power manager 710, an advanced configurable power management interface (ACPI) 711, a dynamic voltage frequency scaling (DVFS) module 712, a CPU driver 713, a graphic composer 721, a GPU driver 722, or a display driver 723.

The display manager may control the state of a display, and the window manager 702 may identify at least one of a size, a position, and a transparency of a window displayed on the display. The window manager 702 may transmit a drawing control instruction to the application 701 (or window) based on the identified information. Depending on the implementation of the system, the display manager and the window manager 702 may be integrated. For convenience of description, hereinafter, expressions for specific operations performed by the window manager 702 will be used. Operations performed by the window manager 702 may be understood as being performed by the window manager 702 or the display manager.

The power manager 710 may manage the power states of the entire system or some modules constituting a device in order to efficiently adjust the current consumption of the system. In addition, the power manager 710 may adjust operation parameters of the CPU 605 (e.g., at least one of a CPU operating voltage, a CPU operating frequency, the number of operating cores, or the number of threads). The power manager 710 may control the ACPI 711 or the DVFS module 712 in order to control the operating parameters of the CPU 605.

The ACPI 711 may manage power of the system, and may provide an independent control method of power of devices and CPU operating frequency according to the state of the system for efficient power management. For example, in the working state, the ACPI 711 may provide power to both the CPU 605 and the display 613, and in the sleep state, the ACPI 711 may provide power to the CPU 605 without supplying power to the display 613.

Figure 7B:
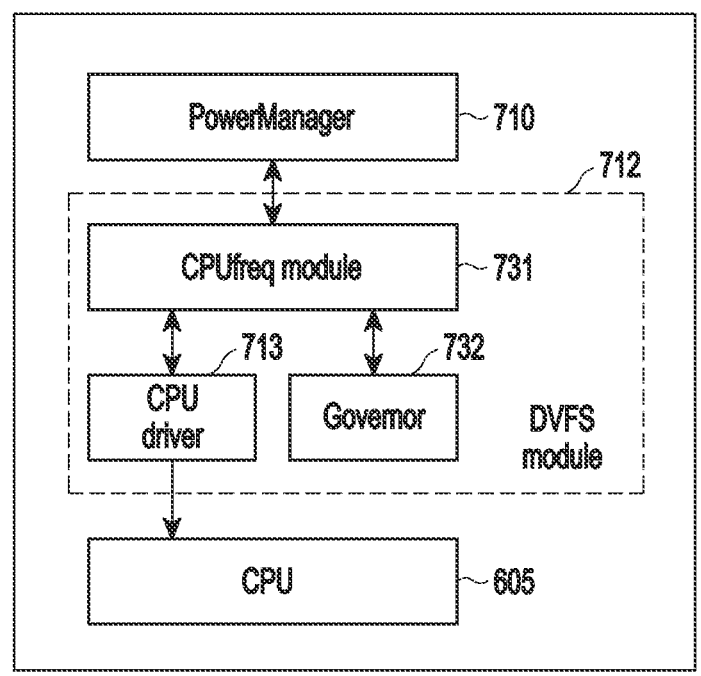
FIG. 7B is a block diagram of a DVFS module, a power manager, and a CPU according to an embodiment of the disclosure.

The DVFS module 712 is described below with reference to FIG. 7B. FIG. 7B is a block diagram of a DVFS module, a power manager, and a CPU according to an embodiment of the disclosure. Referring to FIG. 7B, the DVFS module 712 may include at least one of a CPU frequency module (CPU freq module) 731, a CPU driver 713, or a governor 732. In FIG. 7B, the CPU driver 713 is illustrated as being included in the DVFS module 712, but this is an example. The CPU driver 713 may be implemented outside the DVFS module 712 as illustrated in FIG. 7A. The DVFS module 712 may be a software-based power management module. Since the performance and current consumption of the CPU 605 have a trade-off relationship with each other, the DVFS module 712 may control at least one of an operating voltage, an operating frequency, the number of operating cores, or the number of threads, which are parameters associated with the performance of the CPU 605, in consideration of current consumption. Accordingly, the DVFS module 712 is capable of temporarily boosting the performance of the CPU 605. The performance of the CPU 605 may be improved during the state change period, which will be described below. The CPU driver 713 may be a software module that directly controls the CPU 605. The governor 732 may provide a policy of changing at least one of an operating voltage or an operating frequency of the CPU 605 according to a purpose or situation. The CPU frequency module 731 may be an integrated interface for ensuring independent development or operation of the CPU driver 713 and the governor 732. The power manager 710 may instruct to directly control an operating parameter of the CPU 605 separately from the existing policy or to change a policy of the governor 732 through the CPU frequency module 731.

The input framework 704 may select one of a folded state or an unfolded state based on at least one of sensing information obtained through at least one of the angle sensor driver 705, the distance sensor driver 706, the gyroscope sensor driver 707, or the Hall sensor driver 708. The input framework 704 may output information indicating the identified state. Information indicating the identified state may be referred to as a folding event or an unfolding event.

The folding/unfolding event handler 703 may receive information indicating an identified state (e.g., a folding event or an unfolding event), and may control on/off of each of the first display 501 or the second display 502 via the power manager 710.

The graphic composer 721 may be a module that synthesizes graphic information of each window of a display into data in the frame buffer. The frame buffer may store graphic information to be output on the display as described above. For example, the graphic composer 721 may transmit and receive data to and from the GPU driver 722, and the GPU driver 722 may output data based on a processing result to the display driver 723. The display driver 723 may output data to at least a part of the displays 501 and 502 to output an actual screen based on the received data.

Figure 8:
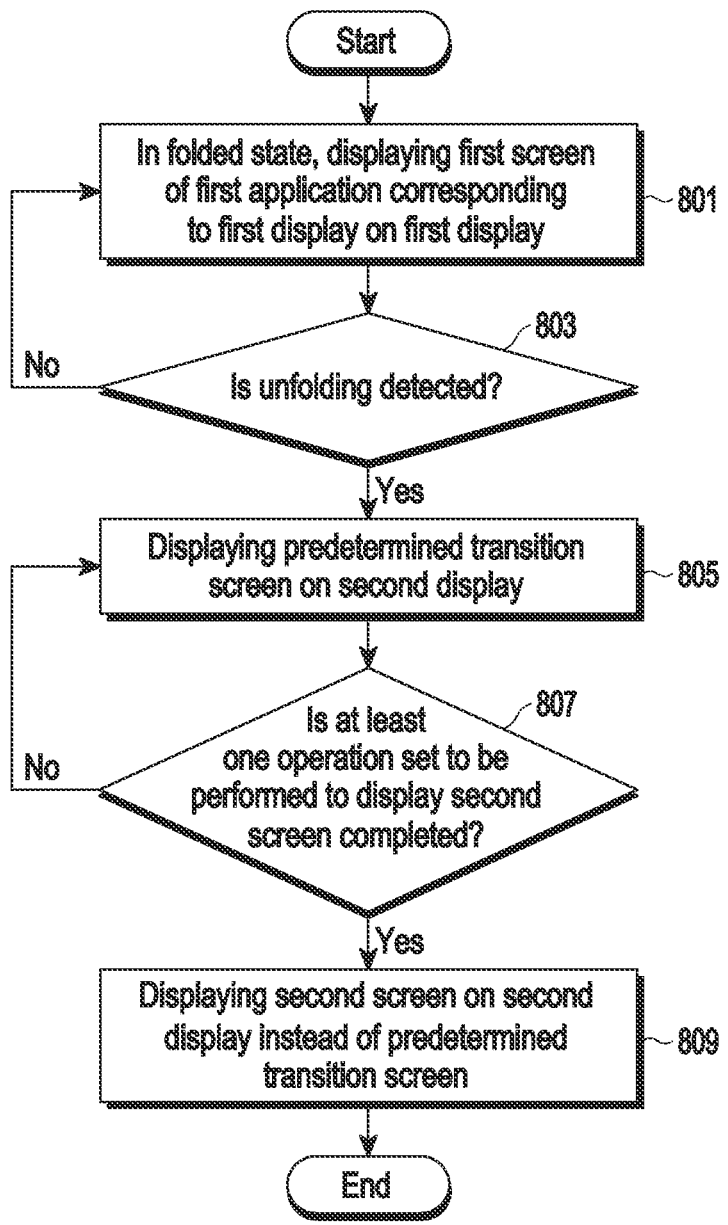
FIG. 8 is a flowchart illustrating a method of operating an electronic device according to an embodiment of the disclosure.
Figure 9A:
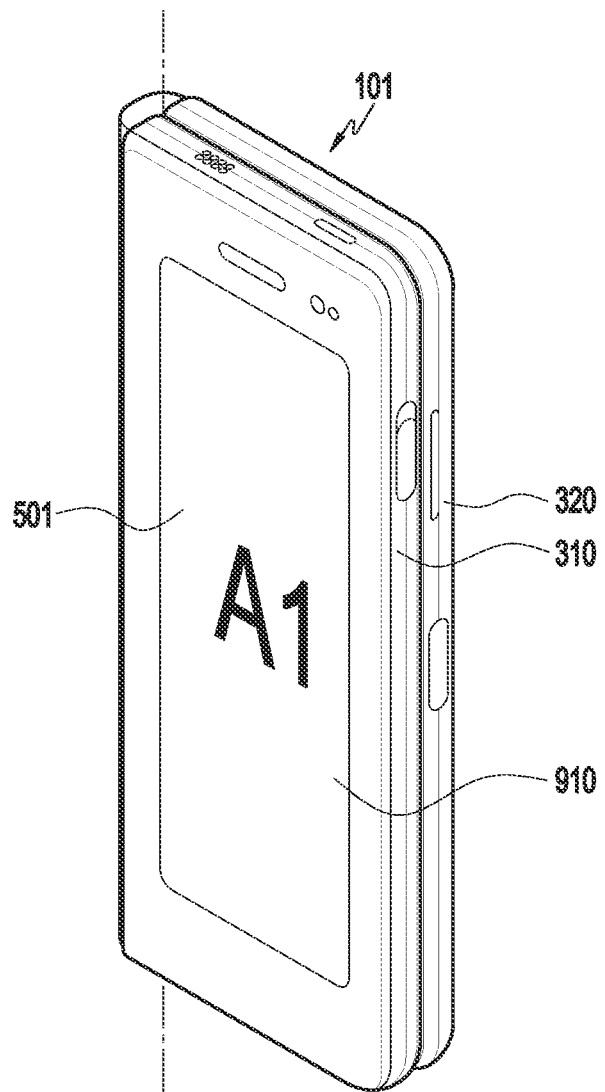
FIG. 9A is a view illustrating an electronic device in a folded state according to an embodiment of the disclosure.
Figure 9B:
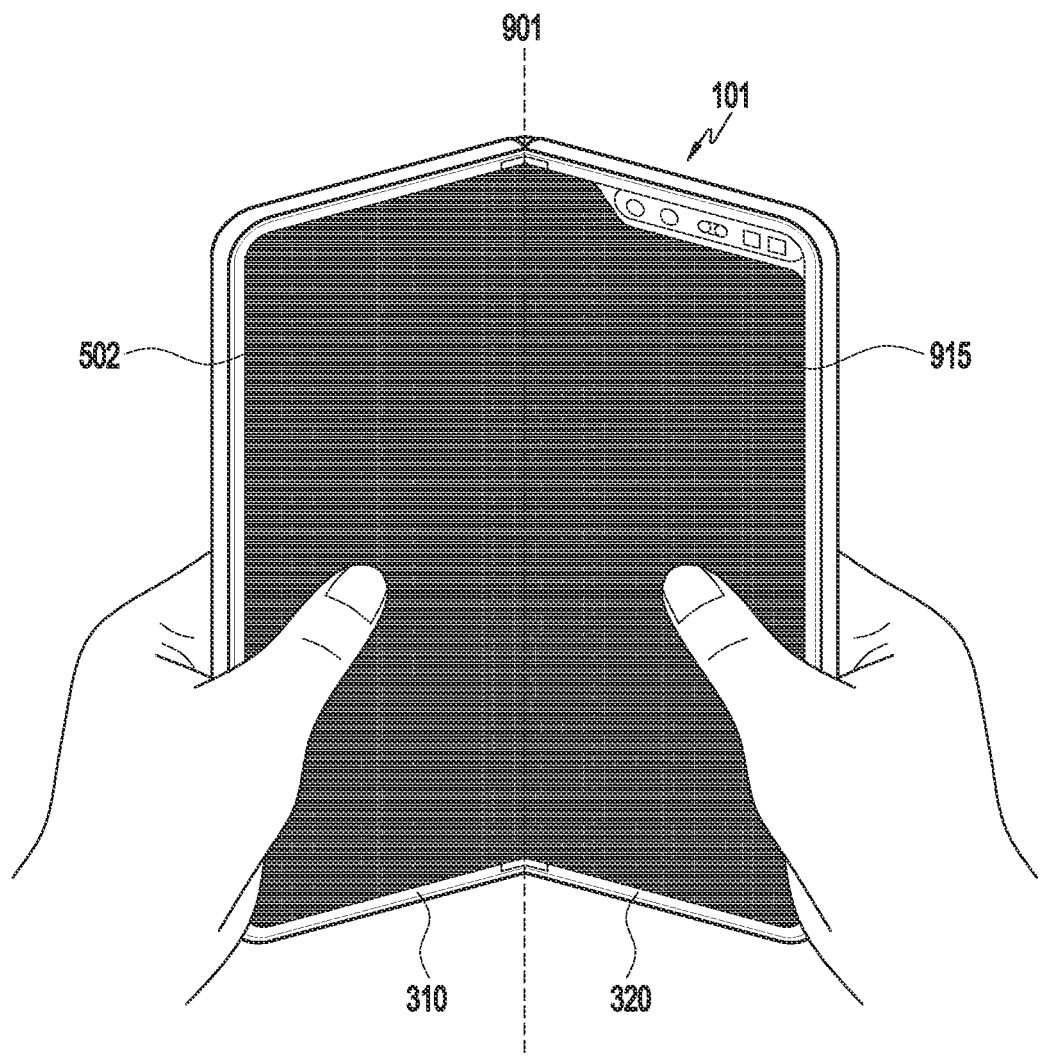
FIG. 9B is a view illustrating an electronic device in a partially unfolded state according to an embodiment of the disclosure.
Figure 9C:
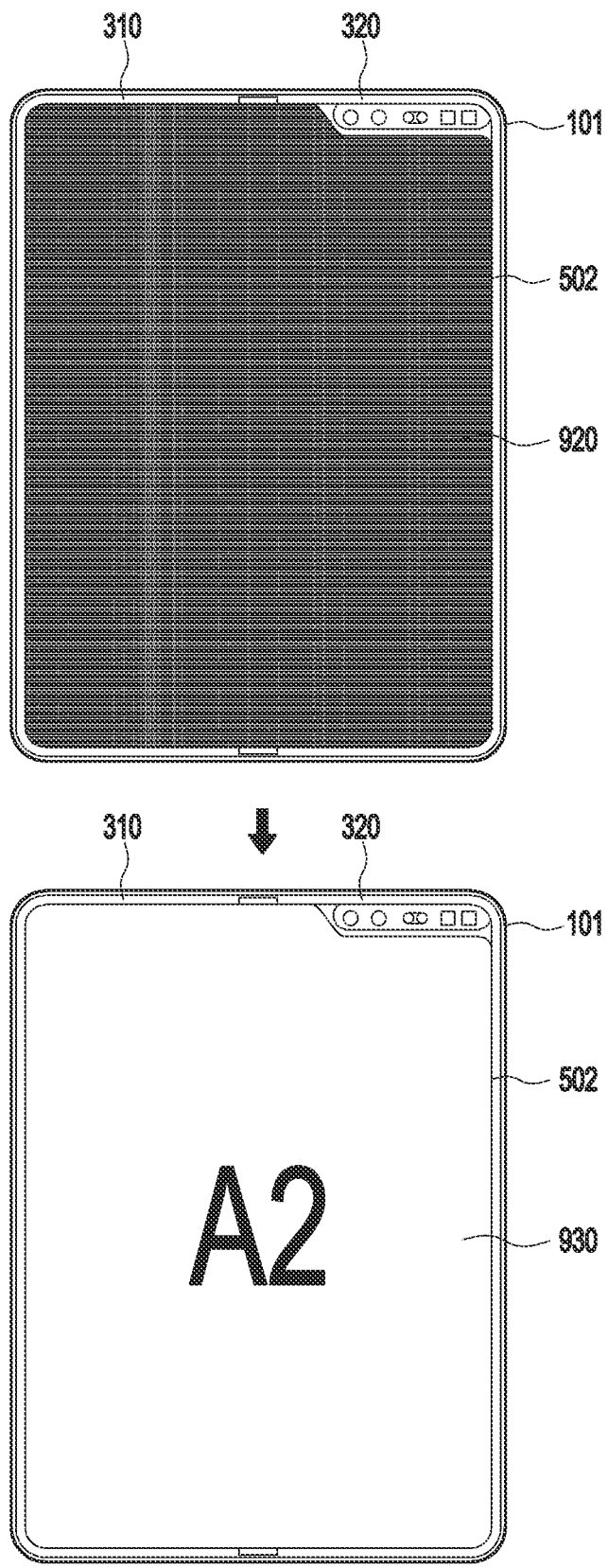
FIG. 9C is a view illustrating an electronic device in a fully unfolded state according to an embodiment of the disclosure.

FIG. 8 is a flowchart illustrating a method of operating an electronic device according to an embodiment of the disclosure. The method of FIG. 8 will be described with reference to FIGS. 9A to 9C. FIG. 9A is a view illustrating an electronic device according to an embodiment of the disclosure in a folded state. FIG. 9B is a view illustrating an electronic device according to an embodiment of the disclosure in a partially unfolded state. FIG. 9C is a view illustrating an electronic device according to an embodiment of the disclosure in a fully unfolded state.

Referring to FIGS. 8 and 9A-9C, in operation 801, while the electronic device 101 is folded, the electronic device 101 (e.g., the processor 120) may display a first screen of a first application corresponding to the first display 501 on the first display 501. In the disclosure, when the electronic device 101 performs a specific operation, it may be understood that the processor 120 performs the specific operation, or may mean that the processor 120 controls other hardware to perform the specific operation. Alternatively, when the electronic device 101 performs a specific operation, it may mean that the specific operation is performed by the processor 120 or other hardware according to instructions stored in the memory 130 are executed. The first screen of the first application may be a screen corresponding to the first state of the first application. The first screen may be a screen for indicating the first state, and may be a screen corresponding to the attributes of the first display 501. For example, the first display 501 may be a display having a relatively small size, and the electronic device 101 may display the first screen corresponding to the size of the first display 501 on the first display 501. For example, the first screen may include information indicating the first state of the first application, but may be configured in a relatively small size. The first screen may be a partial area of a full-screen corresponding to the first state. The first screen may be a screen having a configuration different from the full screen corresponding to the first state. For example, the first screen may be a screen configured to include only predetermined information among full-screens corresponding to the first state, or may be a screen that includes all information but is configured with objects having a relatively small size. For example, referring to FIG. 9A, the electronic device 101 may be in the folded state (i.e., the state in which the first housing structure 310 and the second housing structure 320 are in contact with each other so that the second display 502 is not exposed). In the folded state, the electronic device 101 may display the first screen 910 of the first application on the first display 501.

In operation 803, the electronic device 101 may identify whether unfolding is detected. Based on at least one sensed parameter from at least one of the angle sensor 601, the distance sensor 602, the gyroscope sensor 603, or the Hall sensor 604, the electronic device 101 may identify unfolding, i.e. whether the electronic device is changed into the unfolded state. Referring to FIG. 9B, the user may widen the space between the first housing structure 310 and the second housing structure 320 by unfolding the electronic device around an axis 901 as illustrated in FIG. 9B. A criterion of a parameter for determining the unfolded state may be preset in the electronic device 101. The electronic device 101 may identify whether the electronic device 101 is in the unfolded state depending on whether or not the sensed parameter satisfies the criterion. For example, in FIG. 9B, the electronic device 101 may confirm that the electronic device 101 is in the folded state. While the electronic device 101 is folded, the second display 502 may be in a turn-off state 915. When the electronic device 101 is in the folded state (803: No), the electronic device 101 may maintain the turn-off state of the second display 502 while displaying the first screen on the first display 501.

The user may further widen the space between the first housing structure 310 and the second housing structure 320, and as illustrated in FIG. 9C, the first housing structure 310 and the second housing structure 320 may define substantially the same plane, and the second display 502 may be in the fully unfolded state. The electronic device 101 may identify that at least one sensed parameter satisfies a predetermined condition, and based thereon, may identify that the electronic device 101 is in the unfolded state. The electronic device 101 may be set to identify that the electronic device 101 is in the unfolded state when the angle between the first housing structure 310 and the second housing structure 320 is substantially not 180 degrees but less than 180 degrees.

When unfolding is detected (i.e., when it is identified that the electronic device 101 is in the unfolded state (803: Yes)), then in operation 805, the electronic device 101 may display a predetermined transition screen on the second display 502. For example, referring to FIG. 9C, the electronic device 101 may turn on the second display 502 and display a black screen 920 on the second display 502 as the predetermined transition screen. The black screen 920 is an example of a transition screen, and the transition screen is not limited unless an application (or an operating system) to be displayed on the second display 502 is a newly redrawn screen. The transition screen is not limited as long as the time required to construct the transition screen (e.g., the time required to generate the transition screen or the time required to load the transition screen) is less than or equal to a predetermined threshold time.

The electronic device 101 may perform at least one operation set to be performed to display the second screen in sequence or at least in parallel while displaying the predetermined transition screen on the second display 502. The second screen may be at least a part of the full-screen corresponding to the first state of the first application. The second screen may have a size larger than the size of the first screen. In various embodiments, the second screen may be a screen associated with the first state of the application indicated by the first screen. As described above, the second screen may have a larger size than the first screen. The second screen may have the same configuration as the first screen, but may be a screen reconstructed differently from the first screen in another embodiment. For example, the first application may be a launcher application, the first screen may be a screen in which 1×m icons can be arranged, and the second screen may be a screen in which n×m icons can be arranged. The electronic device 101 may allocate a command for redrawing the second screen to an application (or an operating system), and the application may configure the second screen based on the redrawing command Unless an application provides a function of differently constructing screens for different displays, the operating system of the electronic device 101 may construct different screens for each display based on an application execution screen. Hereinafter, it will be understood by those skilled in the art that the meaning of an expression "an application performs redrawing" may mean that an application (or a window) performs redrawing or may be replaced with a screen configuration by an operating system.

As described above, generating a redrawing command for the second screen and redrawing by an application may be at least one operation configured to be performed to display the second screen. In another embodiment, the second screen may be a screen associated with a second state transitioned from the first state of the first application indicated by the first screen. The first application may be transitioned to the second state by applying an unfolding event in the first state. For example, the first application may be a text transmission/reception application, the first state may be the state of indicating a text list including newly received text, and the second state may be the state of indicating the detailed content of the corresponding newly received text.

The electronic device 101 may not display the second screen suitable for the second display 502 until the execution of the at least one operation is completed. In operation 807, the electronic device 101 may identify whether the execution of the at least one operation set to be performed to display the second screen is completed. When it is identified that the execution of the at least one operation is not completed (807: No), then the electronic device 101 may maintain the display of the predetermined transition screen. When it is identified that the execution of the at least one operation is completed (807: Yes), then in operation 809, the electronic device 101 may display the second screen on the second display 502 in replacement of the predetermined transition screen. For example, as illustrated in FIG. 9C, the electronic device 101 may display the second screen 930 on the second display 502.

Figure 10:
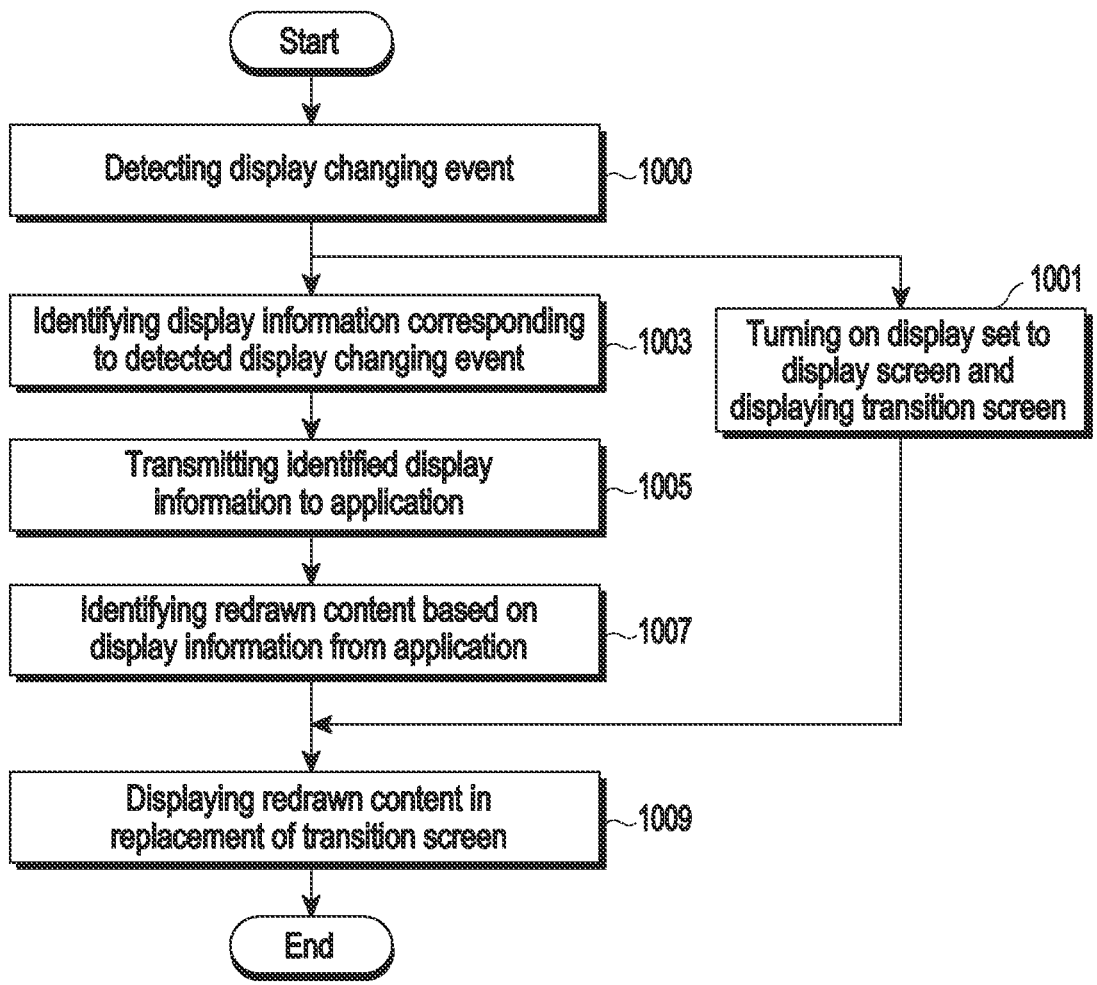
FIG. 10 is a flowchart illustrating a method of operating an electronic device according to an embodiment of the disclosure.

FIG. 10 is a flowchart illustrating a method of operating an electronic device according to an embodiment of the disclosure.

Referring to FIG. 10, the electronic device 101 (e.g., the processor 120) may detect a display changing event in operation 1000. The display changing event is an event for changing a display displaying a screen, and may be a change in the folding state of the electronic device 101. In operation 1001, the electronic device 101 may turn on a display selected to display a screen, and may display a transition screen. For example, the electronic device 101 may perform LCD driver initialization.

In operation 1003, the electronic device 101 may identify display information corresponding to the detected display changing event. For example, when the display changing event is changing from the folded state to the unfolded state, the display corresponding to the display changing event may be the second display 502. When the display changing event is changing from the unfolded state to the folded state, the display corresponding to the display changing event may be the first display 501. The electronic device 101 may identify information on the identified display (e.g., at least one of a resolution (e.g., at least one of a width or a length) or a density of the display). For example, the display manager may provide display information in a call back or polling scheme. The display information may also be used for constructing the second screen, and may also be used for constructing the transition screen.

In operation 1005, the electronic device 101 may transmit the identified display information to the application. In operation 1007, the electronic device 101 may identify the content (i.e., a screen) redrawn based on the display information from the application. In operation 1009, the electronic device 101 may display the redrawn content in replacement of the transition screen. For example, in the state in which the electronic device 101 is folded, the application may provide a first screen corresponding to information on the first display 501, and the electronic device 101 may display the first screen on the first display 501. When changing from the folded state to the unfolded state is identified, the electronic device 101 may transmit information on the second display 502 to the application to request redrawing. The application may generate and provide a second screen based on the information on the second display 502. The electronic device 101 may display the second screen provided by the application on the second display 502. At least one of the above-described identifying information on the display to be converted, requesting redrawing based on the information on the display, and generating a screen by an application in response to the redrawing request, may the at least one operation in operation 807 of FIG. 8.

For example, the input framework 704 may receive sensed information associated with a change in the folded state, and based thereon, may transmit an event corresponding to the folded state to the folding/unfolding event handler 703. The folding/unfolding event handler 703 may transmit a display changing request to the power manager 710 based on the received event. The folding/unfolding event handler 703 may transmit a display changing request based on NotifySwitch/NotifyLidSwitch. It may also be possible to determine the folded state based on a sensor event. For example, when a folding interrupt occurs from the Hall sensor 604, the electronic device 101 may perform control to transmit the folding interrupt to the driver, and when it is identified that a magnetic force of a certain value or more is measured from Hall IC sensing data, the driver may generate a folding event. The electronic device 101 may identify the degree to which the display is folded via the angle sensor 601 and may generate a folding event/unfolding event based on a predetermined angle as a reference.

When the event is received, the folding/unfolding event handler 703 may determine whether to transmit a display changing request to the power manager 710 or the window manager 702. For example, the folding/unfolding event handler 703 may determine whether to transmit the display changing request based on at least one of the execution state of the application, the on/off operation policy of the system according to a folding/unfolding operation, or a display changing permission state of the system. The folding/unfolding event handler 703 may transmit the display changing request based on that the execution state of the application is a state other than the end. The folding/unfolding event handler 703 may transmit the display changing request based on at least one of whether the application is resizable, whether the application request maintaining screen display, or whether the application is a predetermined application. The folding/unfolding event handler 703 may transmit the display changing request when the application is resizable, but may transmit the display changing request based on whether to display in a compatible mode depending on implementation. When resizing is not possible, the electronic device 101 may determine whether to turn off the corresponding screen, whether to display a lock screen, or whether to control the application to operate in the background. The folding/unfolding event handler 703 may receive application information and may determine whether to transmit the display changing request based thereon. The folding/unfolding event handler 703 may transmit the display changing request when the displays are set to be turned on/off depending on the folding/unfolding operation. Since the corresponding policy may be changed according to a user's setting or system setting, the folding/unfolding event handler 703 may transmit the display changing request when the displays are set to be turned on/off depending on the folding/unfolding operation. The folding/unfolding event handler 703 may transmit the display changing request when the display changing of an application execution screen is permitted.

Based on the display changing request, the power manager 710 may turn on a display that is to newly display a screen, and may turn off a display that has previously displayed a screen. The turn-on/turn-off operation may be performed simultaneously or sequentially. In addition, the power manager 710 may control the display manager to write information for controlling the display to be turned on a memory associated with the display. The power manager 710 may perform initialization before controlling the display to be turned on, and may receive, from the window manager 702, information on whether display information (i.e., a redrawn screen) is recorded on the memory. When it is identified that the screen to be displayed is ready based on the received information, the power manager 710 may control the display to be turned on. In this case, the power manager 710 may control the brightness of the turn-on target display to a predetermined brightness, and as another example, the power manager 710 may gradually increase the brightness. Brightness control may be performed by a driving IC associated with the display, rather than by the power manager 710. In general, turn-on/off of the display may be performed by controlling the current applied to the display and controlling the brightness of the light source element of the display device. Depending on the hardware implementation method of the display, the turn-on/off operation may be performed through at least a part of current control or brightness control of the light source element. Accordingly, turn-on/off of the display may be performed only by control of the power manager 710 and all or a part of the display manager.

When receiving the display changing request from the folding/unfolding event handler 703, the window manager 702 may configure and provide a change screen to be displayed. The window manager 702 may request each application (or window) that is being displayed to redraw (or resize) to correspond to the changed display information (e.g., at least one of resolution or density). After the corresponding request, the window manager 702 may wait until the redrawing of applications (or windows) for which the redrawing is requested is completed. For example, the window manager 702 may flag a window in a draw-pending state. When it is identified that all the applications (or windows) enter the drawn state, the window manager 702 may remove the transition screen. For example, the window manager 702 may remove the transition screen when a drawn finish event is identified. In addition, the window manager 702 may also adjust a window on which a screen is to be displayed, to correspond to a display to be changed. Accordingly, a redrawn screen may be displayed on the window having the adjusted size.

Figure 11:
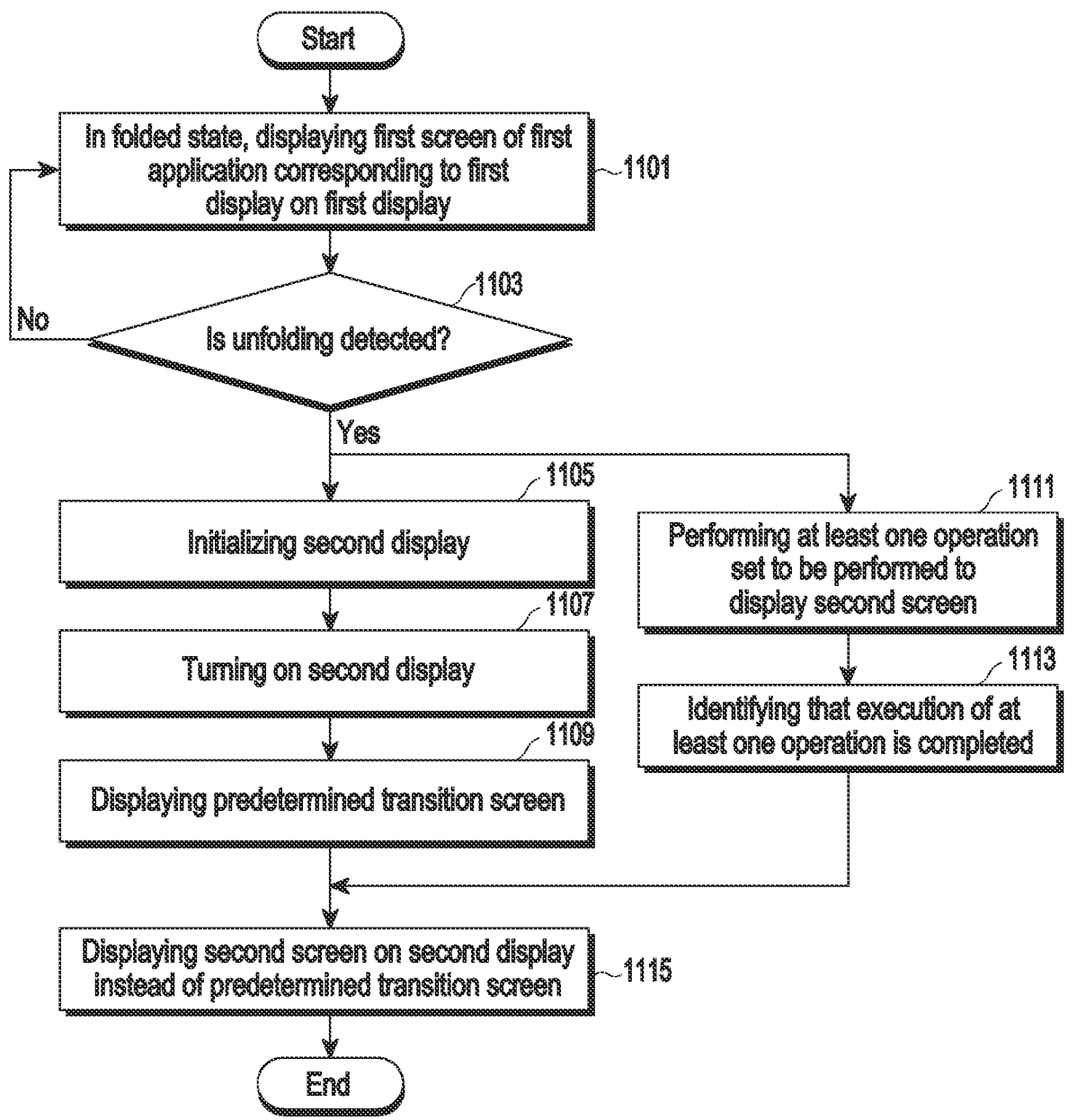
FIG. 11 is a flowchart illustrating a method of operating an electronic device according to an embodiment of the disclosure.
Figure 12A:
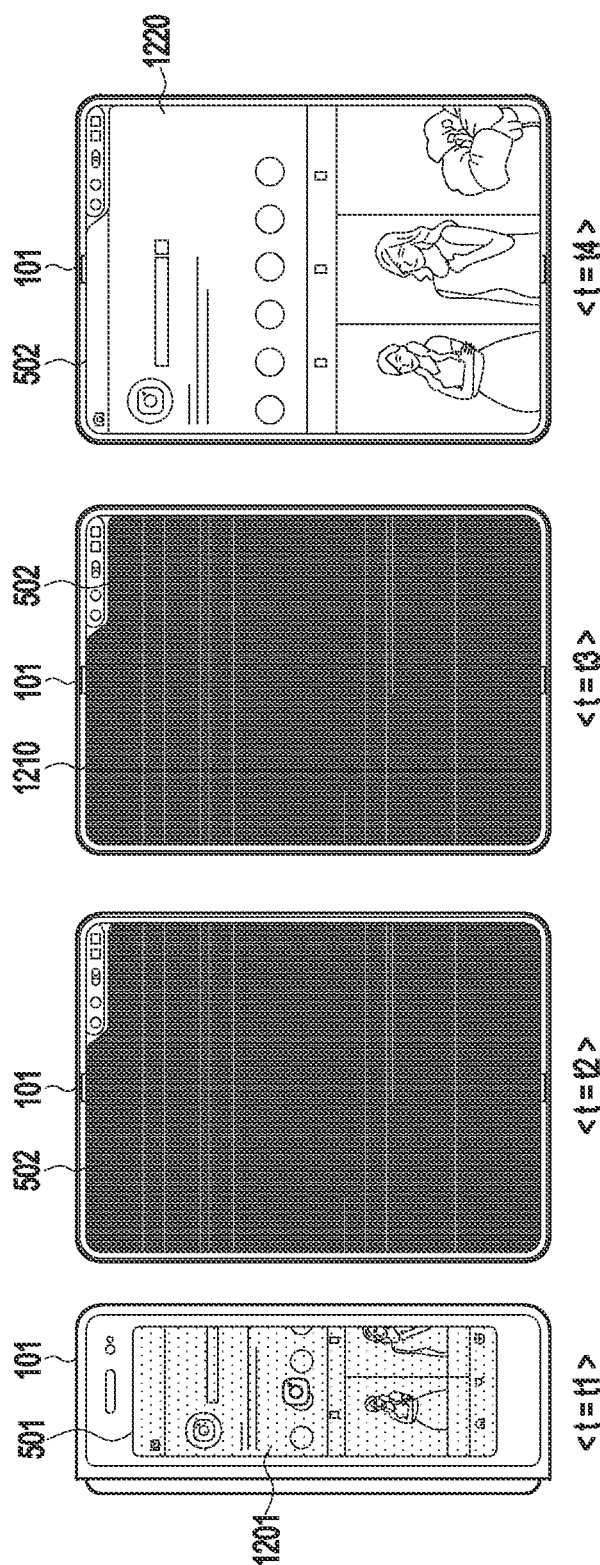
FIG. 12A is a view illustrating a screen change according to a change in a folded state according to an embodiment of the disclosure.

FIG. 11 is a flowchart illustrating a method of operating an electronic device according to an embodiment of the disclosure. Among the operations of FIG. 11, the operations described with reference to FIG. 8 will be briefly described. The embodiment of FIG. 11 will be described in more detail with reference to FIG. 12A. FIG. 12A is a view illustrating a screen change according to a change in a folded state according to an embodiment of the disclosure.

Referring to FIG. 11, in operation 1101, in the folded state, the electronic device 101 (e.g., the processor 120) may display a first screen of a first application corresponding to the first display 501 on the first display 501. For example, referring to FIG. 12A, in the folded state at first time point t1, the electronic device 101 may display a first screen 1201 on the first display 501. In operation 1103, the electronic device 101 may identify whether unfolding is detected, that is, whether the electronic device 101 is changed into the unfolded state. For example, referring to FIG. 12A, the electronic device 101 may transition from the folded state to the unfolded state at second time point t2, and the electronic device 101 may detect unfolding.

The electronic device 101 may initialize the second display 502 in operation 1105. For example, at second time point 2 in FIG. 12A, since the initialization of the second display 502 is not completed yet, the second display 502 may not output a screen. When the initialization of the second display 502 is completed, the electronic device 101 may turn on the second display 502 in operation 1107. In operation 1109, the electronic device 101 may display a predetermined transition screen on the second display 502. For example, at third time point t3 in FIG. 12A, the electronic device 101 may output the transition screen 1210 on the second display 502. In the embodiment of FIG. 12A, the transition screen 1210 may be a black screen, but as described above, the type thereof is not limited.

In operation 1111, the electronic device 101 may perform at least one operation set to be performed to display the second screen. For example, the electronic device 101 may identify information (e.g., at least one of resolution or density) of the second display 502 and may request the application to redraw based on the information. In operation 1113, the electronic device 101 may determine that the execution of the at least one operation is completed. For example, the electronic device 101 may identify that the second redrawn screen is stored in a frame buffer based on information on the second display 502 from the application. When it is identified that the execution of the at least one operation is completed, in operation 1115, the electronic device 101 may display the second screen on the second display 502 in replacement of the predetermined transition screen. For example, at the fourth time point t4 in FIG. 12A, the electronic device 101 may display the second screen 1220 on the second display 502. The electronic device 101 may perform the at least one operation set to be performed to display the second screen in parallel with the initialization and turn-on operations of the second display 502.

Figure 12B:
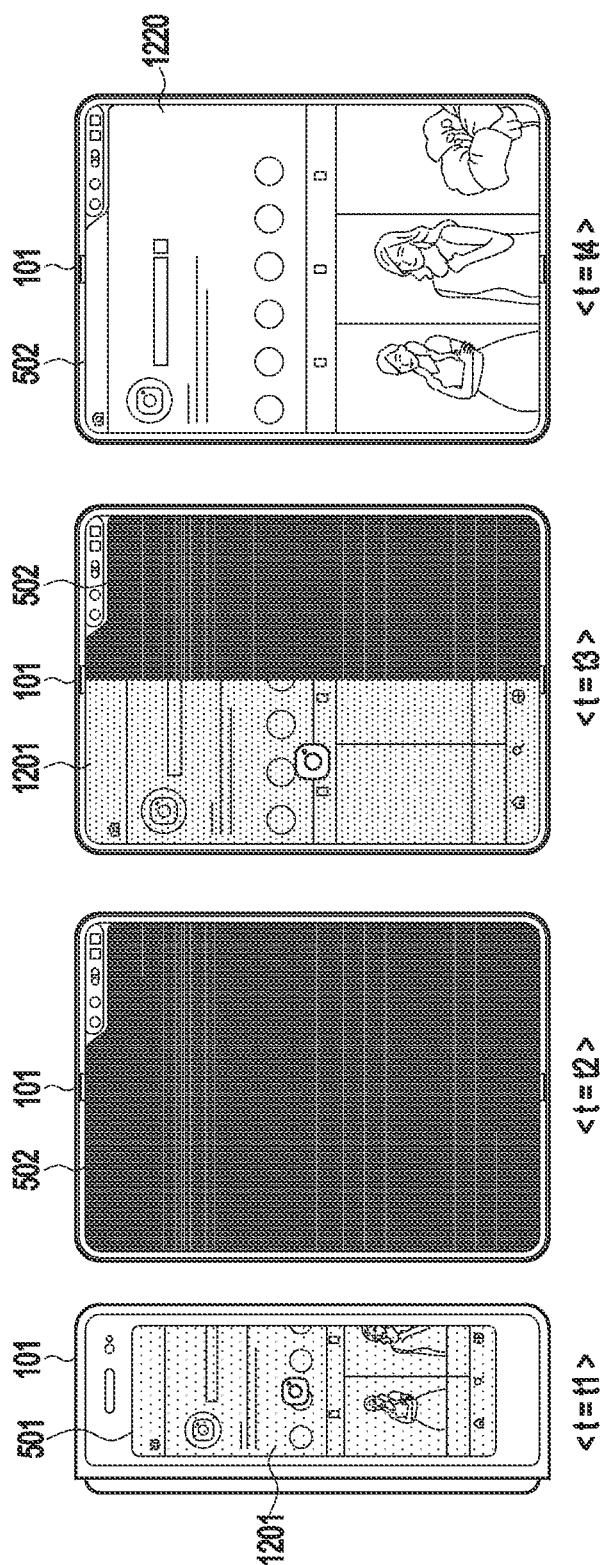
FIG. 12B is a view illustrating a screen change according to a change in a folded state according to a comparative example for comparison according to an embodiment of the disclosure.

FIG. 12B is a view illustrating a screen change according to a change in a folded state according to a comparative example for comparison with an embodiment of the disclosure.

Referring to FIG. 12B, according to a comparative example, when the transition screen 1210 is not displayed as at third time point t3 in FIG. 12A, the first screen 1201, which has been stored in the buffer frame, may be displayed on a partial area of the second display 502 as at third time point t3 in FIG. 12B. Since a different screen is not displayed on the rest of the second display 502, there is a possibility that the user may recognize that the screen is broken, which violates seamless user experience. As the transition screen 1210 is provided, user experience such as seamless moving and displaying of an execution screen of an application may be provided.

The electronic device 101 may turn off the first display 501 while performing an operation of turning on the second display 502. Alternatively, the electronic device 101 may maintain the first display 501 in the turn-on state while the operation of turning on the second display 502 is performed, and may then sequentially turn off the first display 501. When the first display 501 is maintained in the turn-on state, the electronic device 101 may display a transition screen on the first display 501. The electronic device 101 may be set to define one logical display space and display a screen on each of multiple displays 501 and 502 based on the position of the logical display space. For example, a first area of the logical display space may be allocated to the first display 501, and a second area may be allocated to the second display 502. The electronic device 101 may allocate the data of the first area to a frame buffer for the first display 501 and allocate the data of the second area to a frame buffer for the second display 502. As one logical display space is defined, the electronic device 101 may perform control such that a screen generated by one application (e.g., a first application) is displayed on either the first display 501 or the second display 502 and the remaining display is turned off or displays data that is not required to be processed by an application at the corresponding time point. Meanwhile, SurfaceFlinger defined in the electronic device 101 may request the application to process (e.g., redraw) based on at least one of the resolution or the density of the display on which the screen is to be displayed, and may store an execution screen recorded on the surface in the frame buffer of the display on which the screen is to be displayed. The electronic device 101 may open or close a path for data transmission from the SurfaceFlinger to frame buffers. Accordingly, during folding or unfolding, for example, the first screen on the first display 501 may be changed to the second screen on the second display 502.

Figure 13:
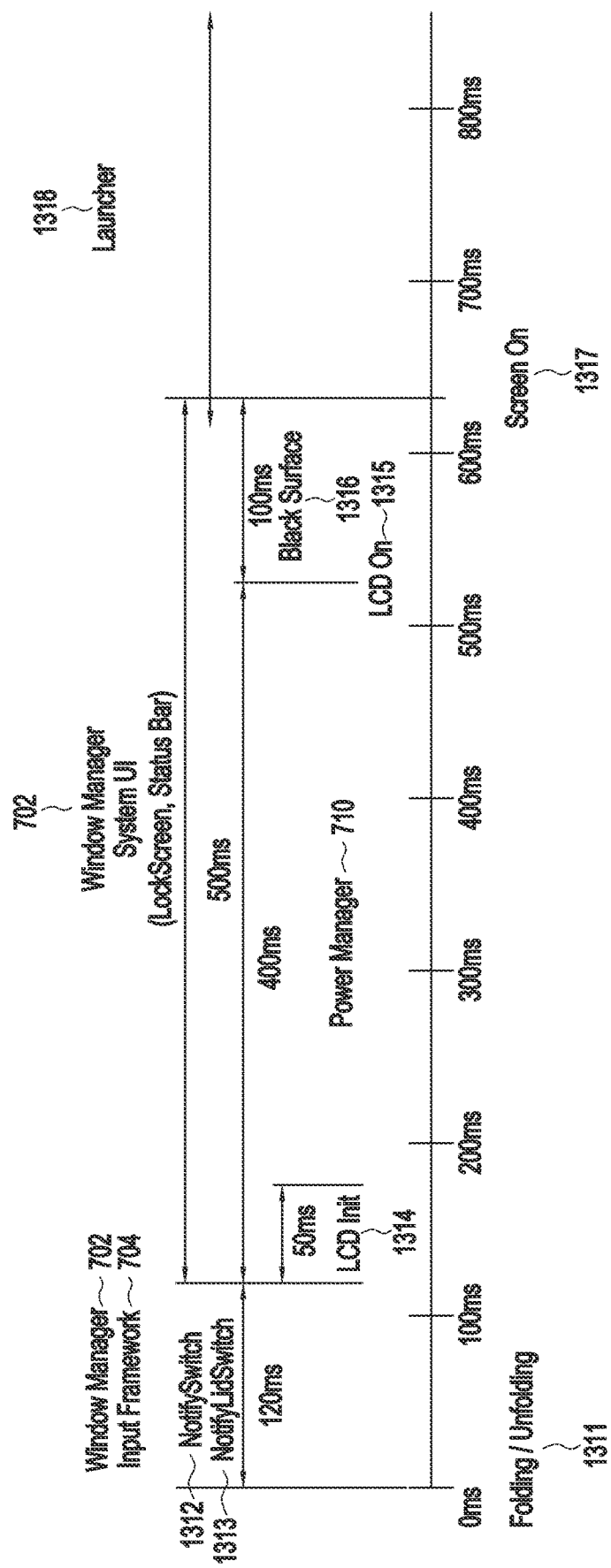
FIG. 13 is a view illustrating timing of operations performed according to a change in a folded state according to an embodiment of the disclosure.

FIG. 13 is a view illustrating timing of operations performed according to a change in a folded state according to an embodiment of the disclosure.

Referring to FIG. 13, in operation 1311, the input framework 704 of the electronic device 101 may identify a folding/unfolding event. The input framework 704 may transmit this to a NotifySwitch 1312/a NotifyLidSwitch 1313. For example, the input framework 704 may transmit the folding/unfolding event to the window manager 702 and the power manager 710 via the folding/unfolding event handler 703.

The power manager 710 may perform display initialization (LCD init) in operation 1314. The power manager 710 may turn on the display (LCD on) in operation 1315. The window manager 702 may provide a black surface 1316 in operation 1316. Meanwhile, the window manager 702 may provide a system UI according to implementation, and may provide, for example, a lock screen or a status bar. The window manager 702 may request the application to redraw the second screen, and when the redrawing is completed, the window manager 702 may perform screen display (screen on) in operation 1317. For example, a screen of a redrawn launcher 1318 may be displayed.

When a security mode is set, the electronic device 101 may not delete the window on the memory even when the screen display is terminated after generation of the window of the system UI (e.g., the lock screen) based on a change in the folded state. The electronic device 101 may control a visible attribute of the window of the system UI. The electronic device 101 may perform control such that the window of the system UI is substantially transparent, and accordingly, the second screen may be displayed. For example, when the electronic device 101 is changed from the folded state to the unfolded state, the electronic device 101 may display the system UI (e.g., the lock screen) on the second display 502. The electronic device 101 may write an object related to drawing of the system UI in the memory. Even when the lock screen is released based on a user's input, the electronic device 101 may control the visible attribute without deleting the window of the lock screen. For example, an application of the electronic device 101 may not delete the window in a manner of not releasing a window buffer for drawing a content and/or preserving a part or all of the drawing elements configuring the window content. In this case, the electronic device 101 may flag the window to be invisible and control the graphic pixel information drawn in the window buffer not to be composed to the display buffer. When the visible attribute is substantially transparently controlled, the electronic device 101 may display the second screen on the second display 502. The electronic device 101 may not delete, for example, a single window or multiple windows of the lock screen. In various embodiments, when a folding event is detected, the electronic device 101 may be set to display a lock screen based on whether it is in a security mode.

Figure 14:
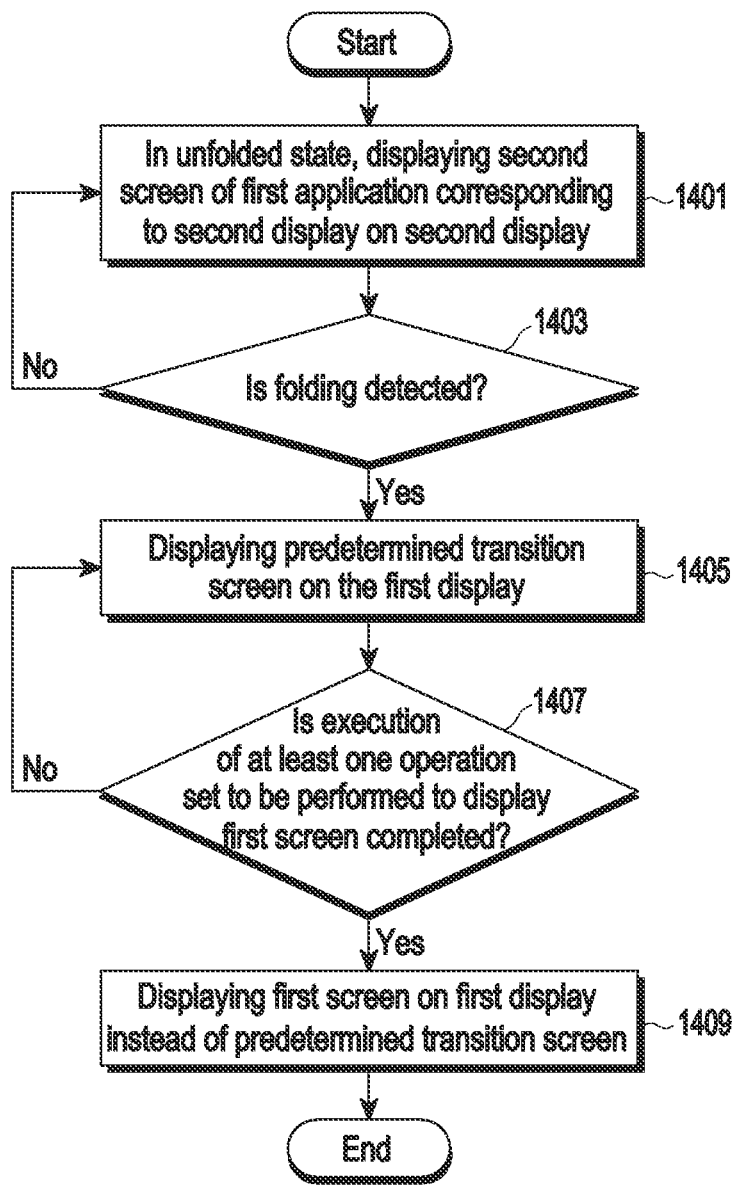
FIG. 14 is a flowchart illustrating a method of operating an electronic device according to an embodiment of the disclosure.

FIG. 14 is a flowchart illustrating a method of operating an electronic device according to an embodiment of the disclosure.

Referring to FIG. 14, in operation 1401, in the unfolded state, the electronic device 101 (e.g., the processor 120) may display a second screen of a first application corresponding to the second display 502 on the second display 502. In operation 1403, the electronic device 101 may identify whether folding is detected (i.e., whether the electronic device 101 is changed into the folded state). The electronic device 101 may identify whether the electronic device 101 is changed into the folded state based on sensing data from at least one sensor. In operation 1405, the electronic device 101 may display a predetermined transition screen on the first display 501. For example, the electronic device 101 may initialize and turn on the first display 501, and may display a transition screen on the first display 501 when the turn-on is completed. The electronic device 101 may perform at least one operation set to be performed to display a first screen corresponding to the first display 501 in parallel. In operation 1407, the electronic device 101 may identify whether the execution of the at least one operation set to be performed to display the first screen is completed. For example, the electronic device 101 may identify information (e.g., at least one of resolution or density) of the first display 501, and may request the application to redraw based on the information. The electronic device 101 may identify that the first screen corresponding to the first display 501 redrawn by the application is stored in a frame buffer. When it is identified that the execution of the at least one operation is completed, then in operation 1409, the electronic device 101 may display the first screen on the first display 501 in replacement of the predetermined transition screen.

The electronic device 101 may perform the operations of FIG. 14 before the operations of FIG. 8 or after the operations of FIG. 8. In addition, a person skilled in the art may apply the operations performed by the electronic device 101 in response to the changing from the folded state to the unfolded state in the disclosure to the changing from the unfolded state to the folded state.

Figure 15:
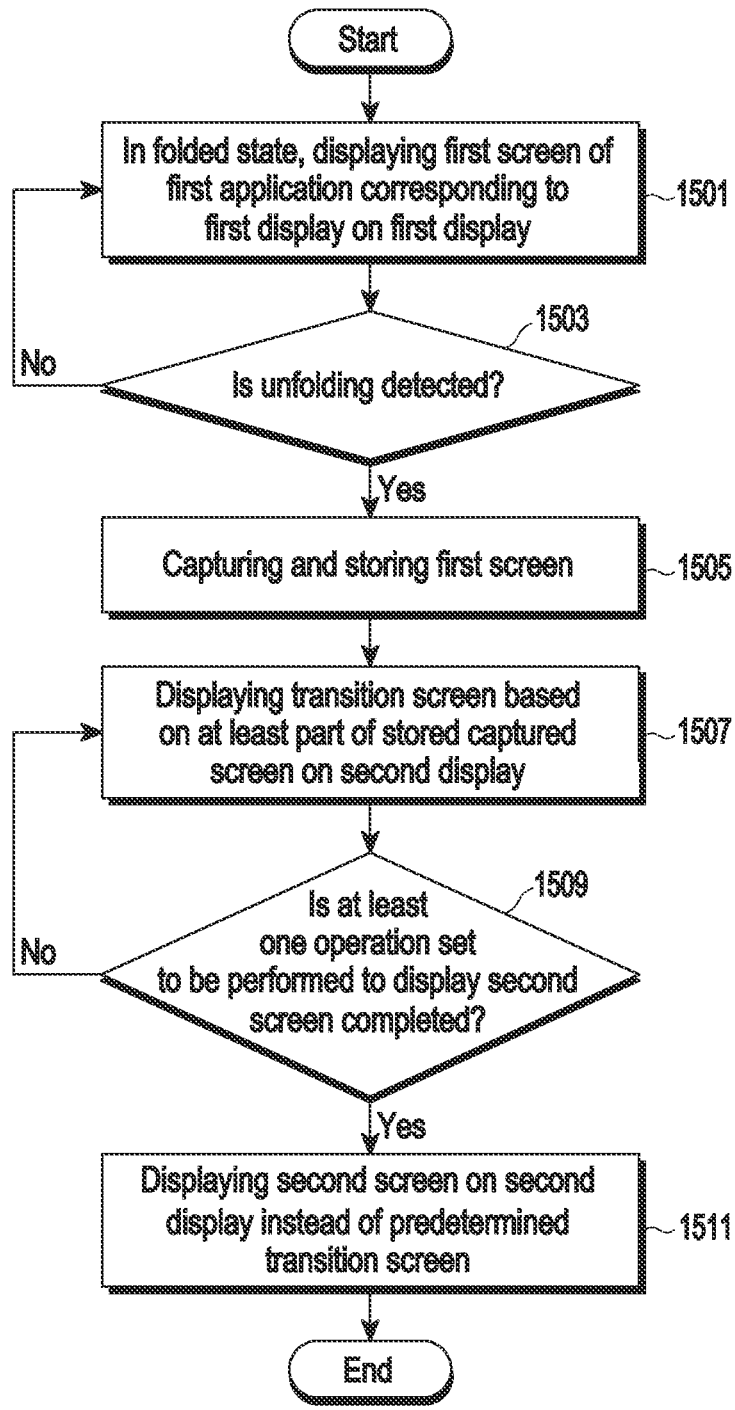
FIG. 15 is a flowchart illustrating a method of operating an electronic device according to an embodiment of the disclosure.
Figure 16:
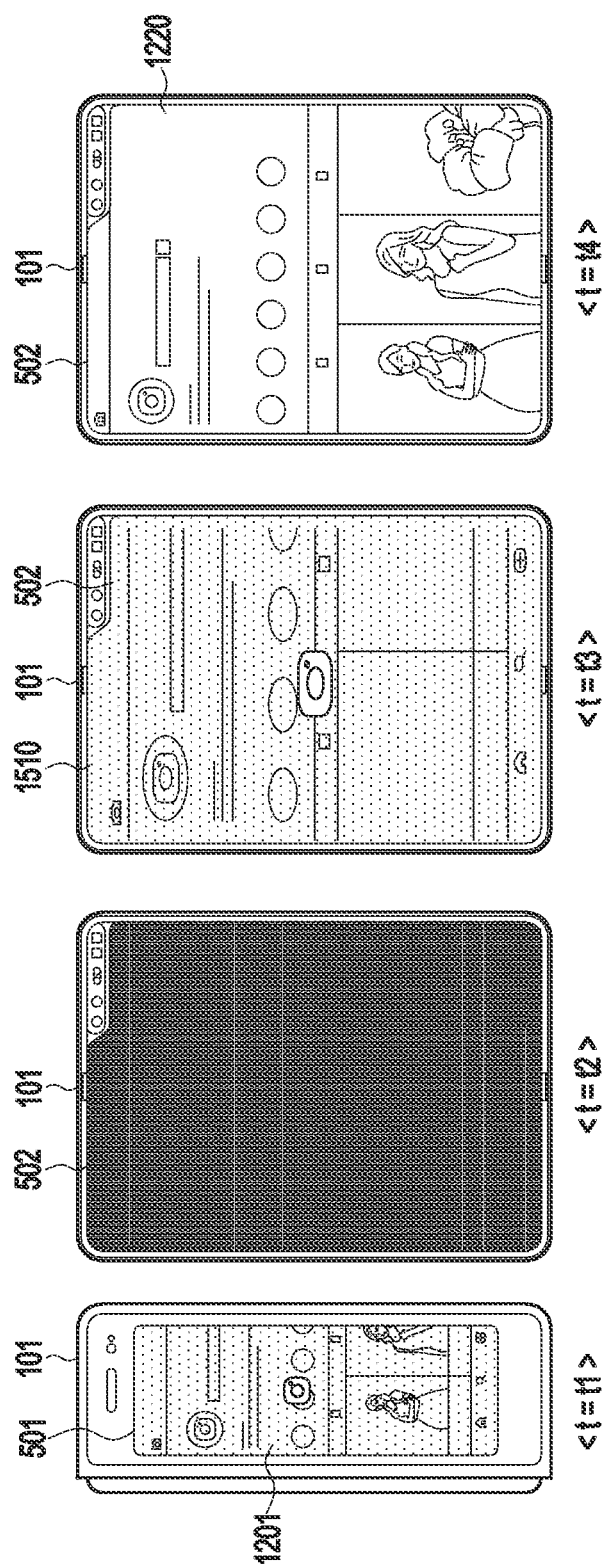
FIG. 16 is a view illustrating an electronic device that displays a captured screen as a transition screen according to an embodiment of the disclosure.

FIG. 15 is a flowchart illustrating a method of operating an electronic device according to an embodiment of the disclosure. The embodiment of FIG. 15 will be described in more detail with reference to FIG. 16. FIG. 16 is a view illustrating an electronic device that displays a captured screen as a transition screen according to an embodiment of the disclosure.

Referring to FIGS. 15 and 16, in operation 1501, in the folded state, the electronic device 101 (e.g., the processor 120) may display a first screen of a first application corresponding to the first display 501 on the first display 501. For example, as at first time point t1 in FIG. 16, the electronic device 101 may display a first screen 1201 on the first display 501. In operation 1503, the electronic device 101 may detect whether the electronic device 101 is unfolded (i.e., whether the electronic device 101 is changed into an unfolded state). For example, at second time point t2 in FIG. 16, the electronic device 101 may be changed into the unfolded state, which may be detected by the electronic device 101.

When unfolding is detected, then in operation 1505, the electronic device 101 may capture and store the first screen. In operation 1507, the electronic device 101 may display a transition screen based on at least a part of the stored capture screen on the second display 502. Since the stored captured screen does not require the operation of the first application, the electronic device 101 may load and display the captured screen on the second display 502 within a relatively short time. For example, as at third time point t3 in FIG. 16, the electronic device 101 may display a transition screen 1510 based on the captured screen on the second display 502. In various embodiments, the electronic device 101 may display, on the second display 502, the transition screen 1510 obtained by enlarging the capture screen. In operation 1509, the electronic device 101 may identify whether the execution of the at least one operation set to be performed to display the second screen is completed. When the execution of the at least one operation is completed, then in operation 1511, the electronic device 101 may display the second screen on the second display 502 in replacement of the predetermined transition screen. For example, as at the fourth time point t4 in FIG. 16, the electronic device 101 may display the second screen 1220 on the second display 502. In addition to the operation of enlarging the captured image, the electronic device 101 may perform blur processing or change an attribute to display a transition screen. The electronic device 101 may provide a predetermined image other than the captured screen or various screens, such as a screen of a specific color, as a transition screen, and there is no limitation on the type thereof.

When folding is detected, the electronic device 101 may downsize at least a part of the captured screen obtained by capturing the second screen, which is being displayed on the second display 502, to correspond to the size of the first display 501 and may display the downsized captured screen.

Figure 17:
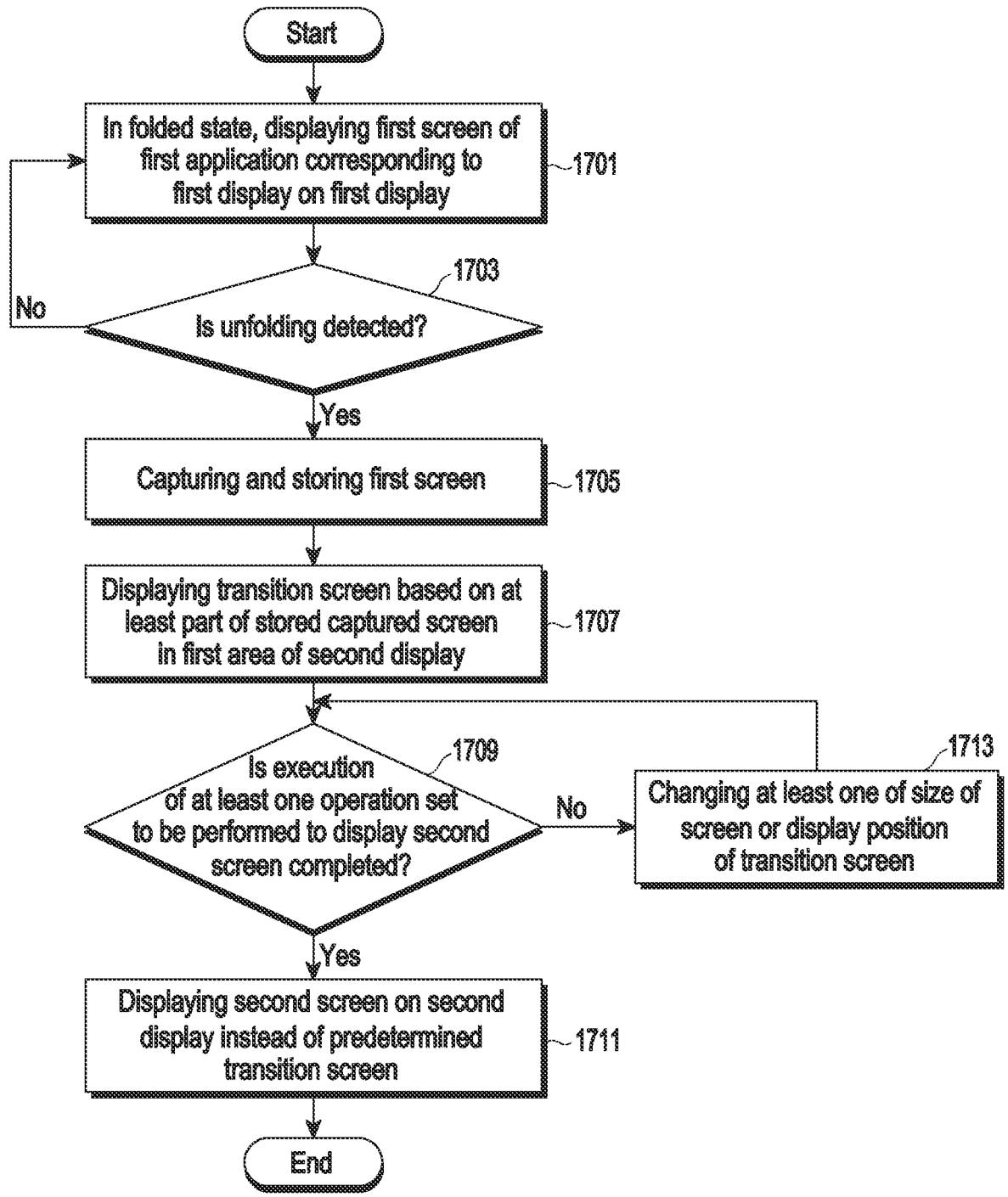
FIG. 17 is a flowchart illustrating a method of operating an electronic device according to an embodiment of the disclosure.
Figure 18:
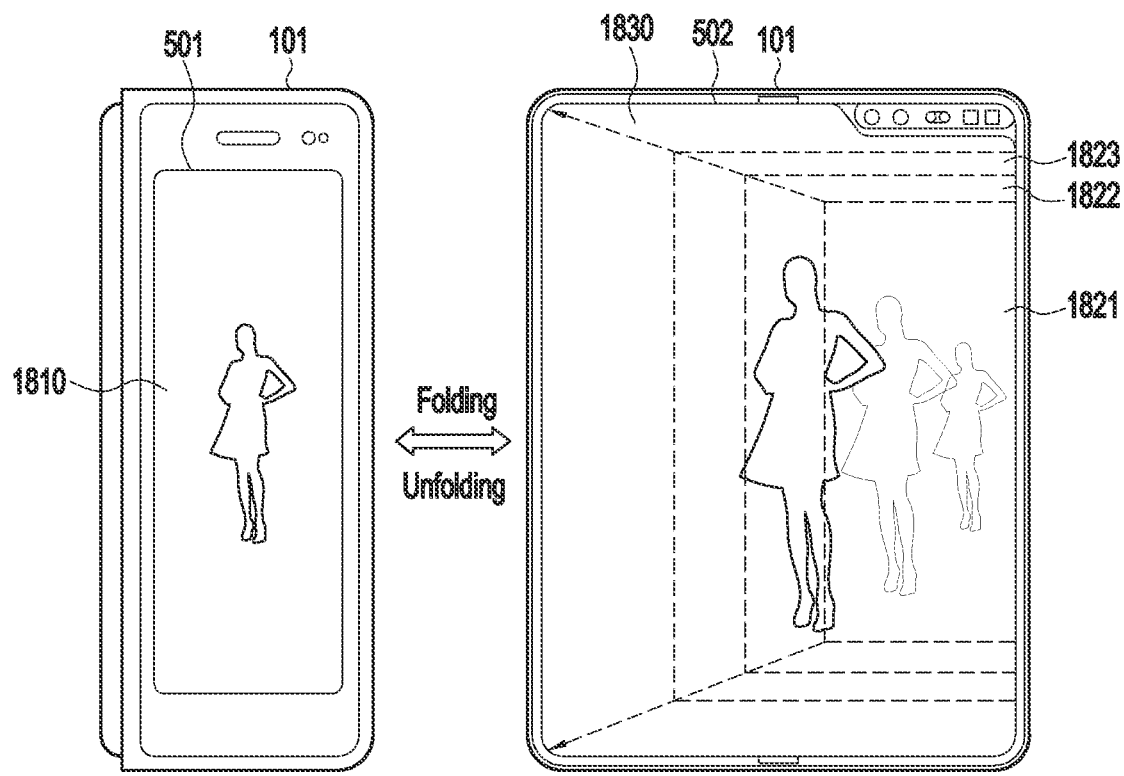
FIG. 18 is a view illustrating an electronic device that displays an animation as a transition screen according to an embodiment of the disclosure.

FIG. 17 is a flowchart illustrating a method of operating an electronic device according to an embodiment of the disclosure. The embodiment of FIG. 17 will be described in more detail with reference to FIG. 18. FIG. 18 is a view illustrating an electronic device that displays an animation as a transition screen according to an embodiment of the disclosure.

Referring to FIGS. 17 and 18, in operation 1701, in the folded state, the electronic device 101 may display a first screen of a first application corresponding to the first display 501 on the first display 501. For example, referring to FIG. 18, the electronic device 101 may display the first screen 1810 on the first display 501. In operation 1703, the electronic device 101 may detect whether the electronic device 101 is unfolded (i.e., whether the electronic device 101 is changed into an unfolded state). For example, referring to FIG. 18, the electronic device 101 may be changed into the unfolded state, which may be detected by the electronic device 101.

When unfolding is detected, then in operation 1705, the electronic device 101 may capture and store the first screen. In operation 1707, the electronic device 101 may display a transition screen based on at least a part of the stored capture screen in the first area of the second display 502. In operation 1709, the electronic device 101 may identify whether the execution of the at least one operation set to be performed to display the second screen is completed. When it is identified that the execution of at least one operation is not completed, in operation 1711, the electronic device 101 may change at least one of the size or the display position of the transition screen. The change of at least one of the size or the display position of the transition screen may be performed while the execution of the at least one operation is completed. Accordingly, the electronic device 101 may sequentially display multiple changed screens in which the captured screen is variously changed, and may output an animation effect in the region 1830. For example, as in FIG. 18, in the unfolded state, the electronic device 101 may sequentially display the captured screen in the first area 1821, the second area 1822, and the third area 1823 of the second display 502. There is no limit to the number of frames that the electronic device 101 includes for configuring an animation. In operation 1713, when the execution of the at least one operation is completed, the electronic device 101 may display the second screen on the second display 502 in replacement of the predetermined transition screen.

Figure 19:
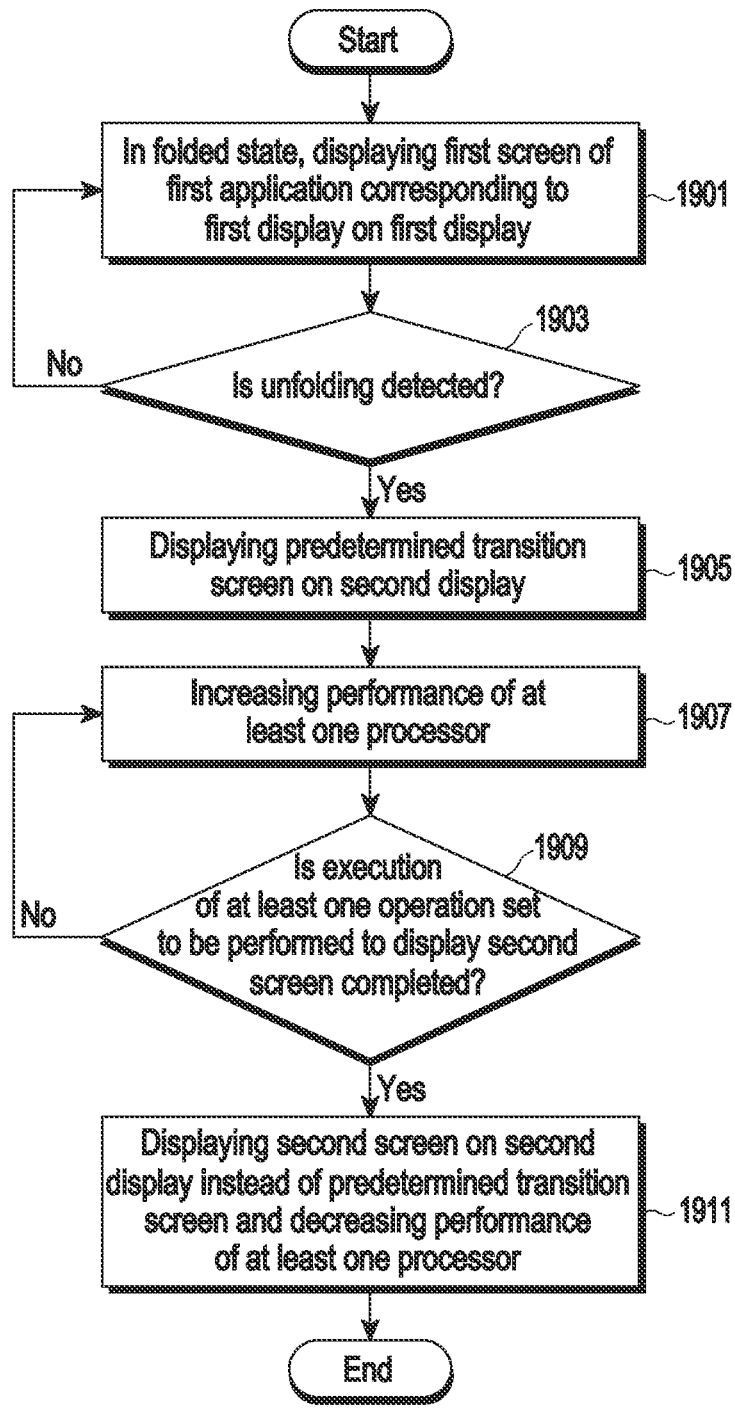
FIG. 19 is a flowchart illustrating a method of operating an electronic device according to an embodiment of the disclosure.

FIG. 19 is a flowchart illustrating a method of operating an electronic device according to an embodiment of the disclosure.

Referring to FIG. 19, in operation 1901, in the folded state, the electronic device 101 (e.g., the processor 120) may display a first screen of a first application corresponding to the first display 501 on the first display 501. In operation 1903, the electronic device 101 may detect whether the electronic device 101 is unfolded. If unfolding is detected, then in operation 1905, the electronic device 101 may display a predetermined transition screen on the second display 502.

The electronic device 101 may increase the performance of at least one processor in operation 1907. The electronic device 101 may switch, for example, the CPU 605 into a high-performance mode. In order to increase the performance of the CPU 605, it is necessary to increase at least one of the operating frequency, the number of operating cores, or the number of threads. However, this has a problem in that heat generation and current consumption of the CPU 605 are also increased. Accordingly, in a general situation, the electronic device 101 may control at least one of the operating frequency, the number of operating cores, or the number of threads of the CPU 605 based on the load of the CPU 605. Based on the heat generation and current consumption, the electronic device 101 may operate with a performance lower than the maximum performance of the CPU 605 in a general situation. When the load increases, the electronic device 101 may gradually increase at least one of the operating frequency, the number of operating cores, or the number of threads of the CPU 605. During the state changing period, the electronic device 101 may increase the performance of the CPU 605, that is, at least one of the operating frequency, the number of operating cores, or the number of threads of the CPU 605. For example, the electronic device 101 may adjust the performance of the CPU 605 using at least one of the power manager 710, the ACPI 711, or the DVFS module 712.

In operation 1909, the electronic device 101 may identify whether the execution of the at least one operation set to be performed to display the second screen is completed. If it is identified that the execution of the at least one operation is completed, then in operation 1911, the electronic device 101 may display a second screen on the second display in replacement of the predetermined transition screen, and may decrease the performance of at least one processor.

When detecting an event, the electronic device 101 may activate a GPU to increase a processing speed, and may then deactivate the GPU after the redrawing is completed and the second screen is displayed.

Figure 20:
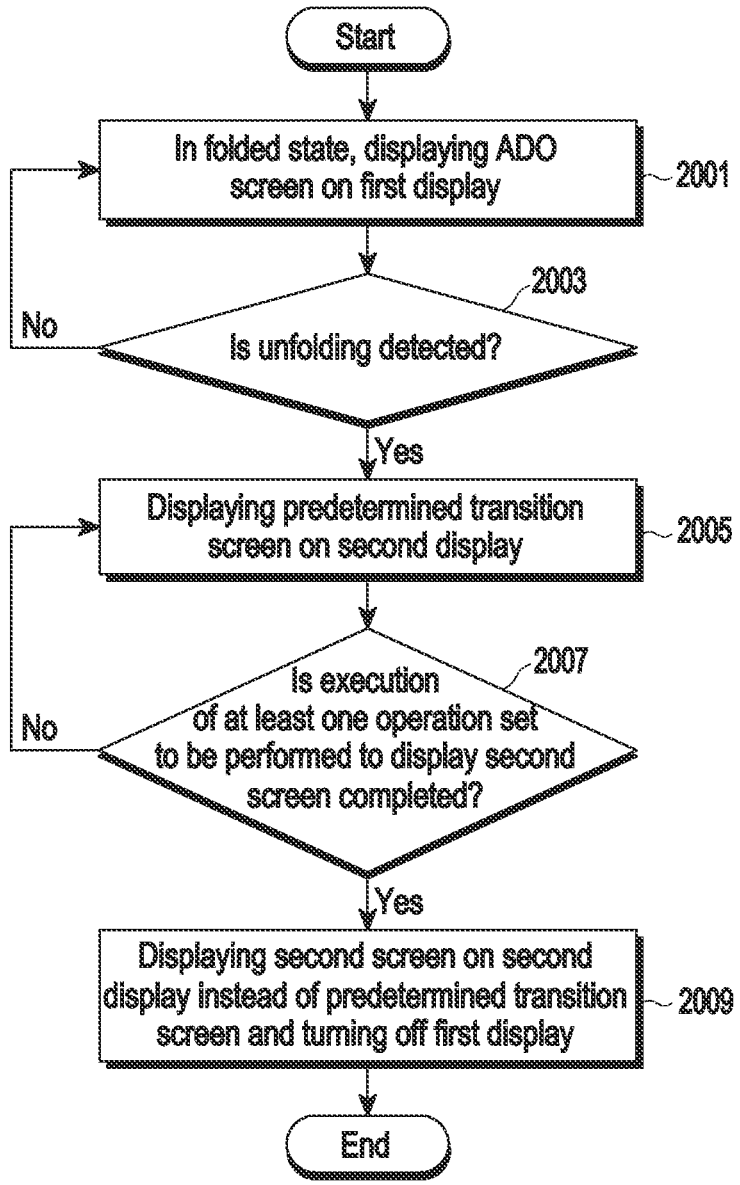
FIG. 20 is a flowchart illustrating a method of operating an electronic device according to an embodiment of the disclosure.

FIG. 20 is a flowchart illustrating a method of operating an electronic device according to an embodiment of the disclosure.

Referring to FIG. 20, in operation 2001, in the folded state, the electronic device 101 (e.g., the processor 120) may display an always-on-display (AOD) screen on the first display 501. The AOD screen may be displayed on the first display 501 while consuming relatively low power. For example, the first display 501 may enter the AOD state by the power manager 710. In the AOD state, the performance of devices such as the CPU 605 or sensor may be limited.

In operation 2003, the electronic device 101 may detect unfolding. If unfolding is detected, then in operation 2005, the electronic device 101 may display a predetermined transition screen on the second display 502. The processor 120 may receive a changing event in a sleep state and may receive an event in the form of an interrupt from, for example, a sensor. The processor 120 may be changed from the sleep state to the active state based on the received interrupt.

In operation 2007, the electronic device 101 may identify whether the execution of the at least one operation set to be performed to display the second screen is completed. If it is identified that the execution of the at least one operation is completed, then in operation 2009, the electronic device 101 may display a second screen on the second display 502 in replacement of the predetermined transition screen, and may turn off the first display 501. The electronic device 101 may be configured to maintain the displaying of the AOD screen on the first display 501 while performing the at least one operation, and to turn off the first display 501 after the execution of the at least one operation is completed.

The electronic device 101 may detect folding in the unfolded state. The electronic device 101 may turn off the second display 502 in response to the detection of the folding, and may turn on at least a portion of the first display 501 to display the AOD screen.

Figure 21:
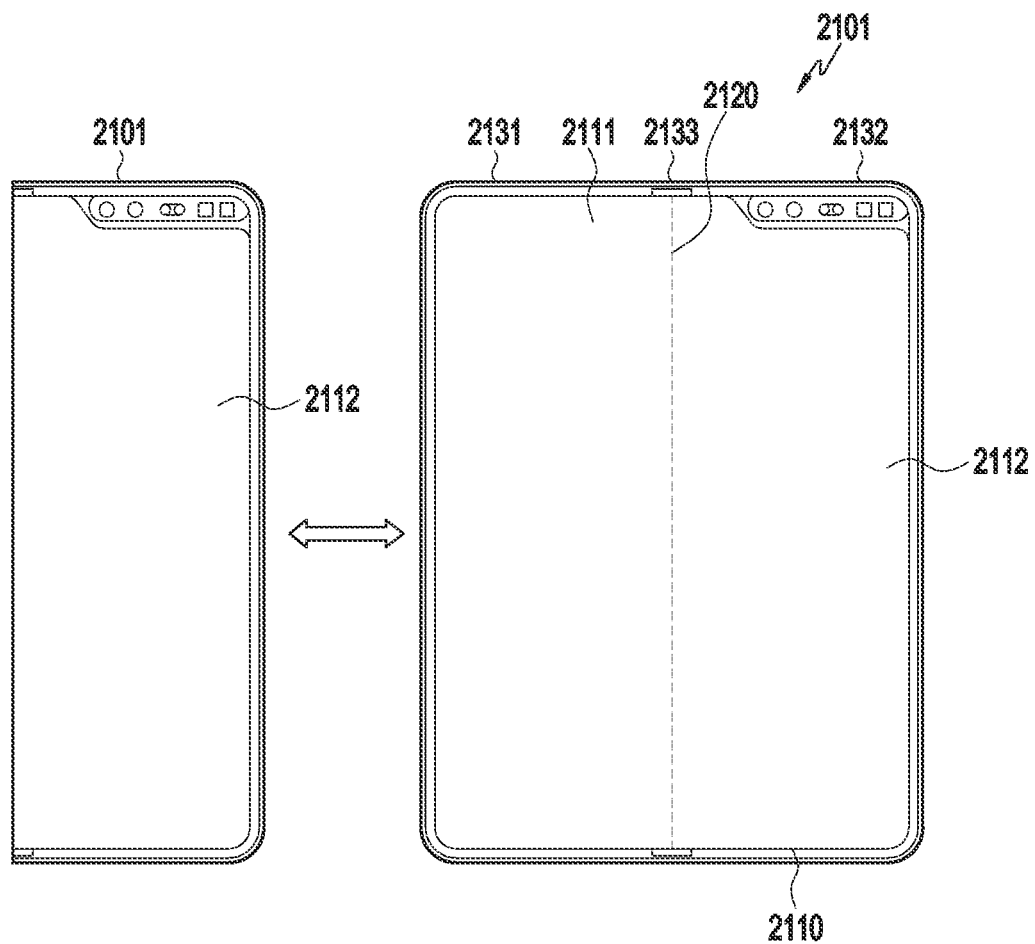
FIG. 21 is a view illustrating a folded state and an unfolded state of an electronic device according to an embodiment of the disclosure.

FIG. 21 is a view illustrating a folded state and an unfolded state of an electronic device according to an embodiment of the disclosure.

Referring to FIG. 21, an electronic device 2101 may include a first housing structure 2131, a second housing structure 2132, and a hinge structure 2133 between the first housing structure 2131 and the second housing structure 2132. A flexible display 2110, at least a portion of which is flexible, may be disposed on one surfaces of the first housing structure 2131 and the second housing structure 2132. The display 2110 may be bent outwards with reference to, for example, a boundary line 2120. Assuming that the electronic device 101 is folded inwards in the above-described embodiment, in the embodiment of FIG. 21, the electronic device 2101 may be folded outwards. In the folded state, the first housing structure 2131 and the second housing structure 2132 may come into contact with each other at least in part. In this case, a first area 2111 and a second area 2112 of the display 2110 may be oriented in different directions, respectively. In the folded state the second area 2112 of the display 2110 may be exposed on the front surface, and, the first area 2111 of the display 2110 may be exposed on the rear surface. The electronic device 2101 may include at least one device of the electronic device 101.

Figure 22:
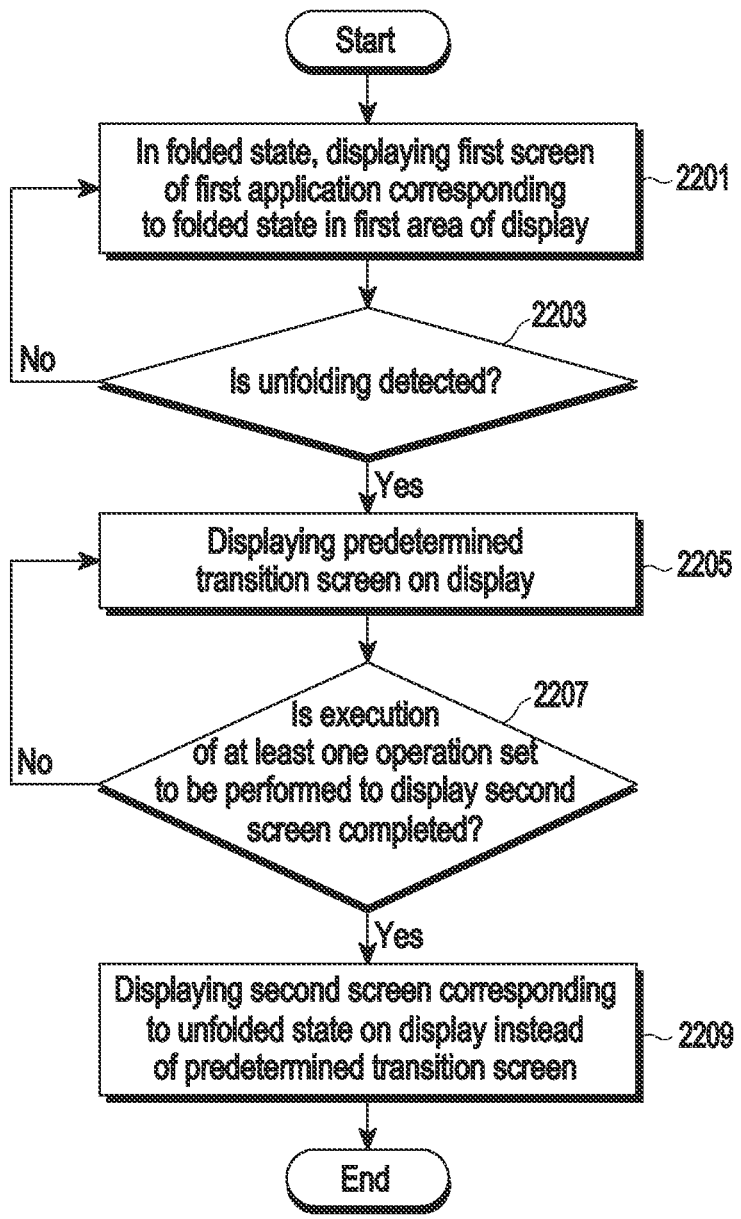
FIG. 22 is a flowchart illustrating a method of operating an electronic device according to an embodiment of the disclosure.

FIG. 22 is a flowchart illustrating a method of operating an electronic device according to an embodiment of the disclosure.

Referring to FIG. 22, in operation 2201, in the folded state, the electronic device 2101 (e.g., the processor 120) may display a first screen of a first application corresponding to the folded state, in the first area 2111 of the display 2110. In operation 2203, the electronic device 2101 may detect unfolding. If unfolding is detected, then in operation 2205, the electronic device 2101 may display a predetermined transition screen on the display 2110. As described above, the transition screen may be an arbitrary screen, or may be a still image or an animation based on the captured screen of the first screen. In operation 2207, the electronic device 2101 may identify whether the execution of the at least one operation set to be performed to display the second screen is completed. If it is determined that the execution of the at least one operation is completed, then in operation 2209, the electronic device 2101 may display a second screen corresponding to the unfolded state on the display 2110, in replacement of the predetermined transition screen.

An electronic device (e.g., the electronic device 101 in FIG. 1) may include a hinge structure (e.g., the hinge structure 510), a first housing (e.g., the first housing structure 310) connected to the hinge structure (e.g., the hinge structure 510), and including a first surface oriented in a first direction, and a second surface oriented in a second direction opposite the first direction, a second housing (e.g., the second housing structure 320) connected to the hinge structure (e.g., the hinge structure 510), and including a third surface oriented in a third direction, and a fourth surface oriented in a fourth direction opposite the third direction, wherein the second housing is folded with respect to the first housing (e.g., the first housing structure 310) about the hinge structure (e.g., the hinge structure 510), a first display (e.g., the first display (e.g., a first display (501)) visible through at least a portion of the first surface of the first housing (e.g., the first housing structure 310), a second display (e.g., the second display 502) extending from the second surface to the fourth surface across the hinge structure (e.g., the hinge structure 510), wherein at least a partial area of the second display corresponding to the hinge structure (e.g., the hinge structure 510) is flexible, and at least one processor (e.g., the processor 120). In a folded state, the second surface may face the fourth surface, in an unfolded state, the third direction may be substantially the same as the first direction, in the folded state, a first area of the second display (e.g., the second display 502) may face a second area of the second display (e.g., the second display 502), and in the unfolded state, the first area may define substantially the same plane as the second area. The at least one processor (e.g., the processor 120) may be configured to control, in the folded state, the first display (e.g., the first display 501) to display a first screen of a first application corresponding to the first display (e.g., the first display 501), control the second display (e.g., the second display 502) to display a transition screen based on detection of unfolding from the folded state to the unfolded state, and when it is detected that execution of at least one operation set to be performed to display a second screen of the first application corresponding to the second display (e.g., the second display 502) is completed, control the second display (e.g., the second display 502) to display the second screen in replacement of the transition screen.

The at least one processor (e.g., the processor 120) may be further configured to perform the at least one operation set to be performed to display the second screen. The at least one operation may include at least a part of an operation of identifying information on the second display (e.g., the second display 502), an operation of requesting the first application to configure the second screen based on the information on the second display (e.g., the second display 502), and an operation of acquiring data for displaying the second screen using the first application.

The at least one processor (e.g., the processor 120) may be further configured to perform control to initialize the second display (e.g., the second display 502) and turn on the second display (e.g., the second display 502) in parallel while performing an operation of performing the at least one operation set to be performed to display the second screen, and may be configured to control the second display (e.g., the second display 502) to display the transition screen after turning on the second display (e.g., the second display 502), as at least a part of an operation of controlling the second display (e.g., the second display 502) to display the transition screen.

The at least one processor (e.g., the processor 120) may be further configured to adjust an operating performance of the at least one processor (e.g., the processor 120) to a predetermined performance based on the detection of the unfolding, and the at least one operation may be performed based on the predetermined performance of the at least one processor (e.g., the processor 120).

The at least one processor (e.g., the processor 120) may be configured to control the second display (e.g., the second display 502) to display a predetermined screen or a black screen as the transition screen, as at least a part of an operation of controlling the second display (e.g., the second display 502) to display the transition screen.

The at least one processor (e.g., the processor 120) may be configured to control the second display (e.g., the second display 502) to display a captured screen acquired by capturing the first screen as the transition screen, as at least a part of an operation of controlling the second display (e.g., the second display 502) to display the transition screen.

The at least one processor (e.g., the processor 120) may be configured to control the second display (e.g., the second display 502) to adjust the size of the captured screen and display the adjusted captured screen, as at least a part of an operation of controlling the second display (e.g., the second display 502) to display the transition screen.

The at least one processor (e.g., the processor 120) may be configured to control the second display (e.g., the second display 502) to display sequentially multiple adjusted captured screens provided by adjusting the size of the captured screen, as at least a part of an operation of controlling the second display (e.g., the second display 502) to display the transition screen.

The at least one processor (e.g., processor 120) may be further configured to turn off the first display (e.g., the first display 501) while performing the at least one operation set to be performed to display the second screen of the first application corresponding to the second display (e.g., second display 502).

The at least one processor (e.g., processor 120) may be further configured to display a predetermined screen on the first display (e.g., the first display 501) while the second screen is being displayed on the second display (e.g., the second display 502) in replacement of the transition screen, and to turn off the first display (e.g., the first display 501) after the second screen is displayed.

According to an embodiments of the disclosure, a method of operating an electronic device (e.g., the electronic device 101) may include controlling, by the at least one processor (the processor 120) and in the folded state, the first display (e.g., the first display 501) to display a first screen of a first application corresponding to the first display (e.g., the first display 501), controlling, by the at least one processor (e.g., the processor 120), the second display (e.g., the second display 502) to display a transition screen based on detection of unfolding from the folded state to the unfolded state, and controlling, by the at least one processor (e.g., the processor 120), the second display (e.g., the second display 502) to display the second screen in replacement of the transition screen when it is detected that execution of at least one operation set to be performed to display a second screen of the first application corresponding to the second display (e.g., the second display 502) is completed.

The method may further include performing, by the at least one processor (e.g., the processor 120), the at least one operation set to be performed to display the second screen, wherein the at least one operation may include at least a part of an operation of identifying information on the second display (e.g., the second display 502), an operation of requesting the first application to configure the second screen based on the information on the second display (e.g., the second display 502), and an operation of acquiring data for displaying the second screen using the first application.

The method may further include performing, by the at least one processor (e.g., the processor 120), controlling to initialize the second display (e.g., the second display 502) and turn on the second display (e.g., the second display 502) in parallel while performing an operation of performing the at least one operation set to be performed to display the second screen, and in the controlling of the second display (e.g., the second display 502) to display the transition screen, the second display (e.g., the second display 502) may be controlled to display the transition screen after the second display (e.g., the second display 502) is turned on.

The method may further include adjusting, by the at least one processor (e.g., the processor 120), an operating performance of the at least one processor (e.g., the processor 120) to a predetermined performance based on the detection of the unfolding, and the at least one operation may be performed based on the predetermined performance of the at least one processor (e.g., the processor 120).

In the controlling of the second display (e.g., the second display 502) to display the transition screen, the second display (e.g., the second display 502) may be controlled to display a predetermined screen or a black screen as the transition screen.

In the controlling of the second display (e.g., the second display 502) to display the transition screen, the second display (e.g., the second display 502) may be controlled to display a captured screen acquired by capturing the first screen as the transition screen.

In the controlling of the second display (e.g., the second display 502) to display the transition screen, the second display (e.g., the second display 502) may be controlled to adjust the size of the captured screen and to display the adjusted captured screen.

In the controlling of the second display (e.g., the second display 502) to display the transition screen, the second display (e.g., the second display 502) may be controlled to sequentially display multiple adjusted captured screens provided by adjusting the size of the captured screen.

According to various embodiments of the disclosure, an electronic device (e.g., the electronic device 2101) may include a hinge structure (e.g., the hinge structure 2133), a first housing (e.g., the first housing structure 2131) connected to the hinge structure (e.g., the hinge structure 2133), a second housing (e.g., the second housing structure 2132) connected to the hinge structure (e.g., the hinge structure 510), and configured to be folded with respect to the first housing (e.g., the first housing structure 2131) about the hinge structure (e.g., the hinge structure 2133), a display extending from the first housing (e.g., the first housing structure 2131) to the second housing (e.g., the second housing structure 2132) across the hinge structure (e.g., the hinge structure 2133), wherein at least a partial area of the display corresponding to the hinge structure (e.g., the hinge structure 2133) is flexible, and at least one processor (e.g., the processor 120). The at least one processor (e.g., the processor 120) may be configured to control, in the folded state, the display (e.g., the display 2110) to display a first screen of a first application corresponding to the folded state on a first area of the display (e.g., the display 2110), control the display (e.g., the display 2110) to display a transition screen based on detection of unfolding from the folded state to the unfolded state, and control the display (e.g., the display 2110) to display the second screen in replacement of the transition screen when it is detected that execution of at least one operation set to be performed to display a second screen of the first application corresponding to the unfolded state is completed. In the folded state, the first area and the remaining areas other than the first area may be oriented in different directions, respectively.

According to various embodiments of the disclosure, an electronic device (e.g., the electronic device 101) may include a hinge structure (e.g., the hinge structure 510), a first housing (e.g., the first housing structure 310) connected to the hinge structure (e.g., the hinge structure 510), and including a first surface oriented in a first direction, and a second surface oriented in a second direction opposite the first direction, a second housing (e.g., the second housing structure 320) connected to the hinge structure (e.g., the hinge structure 510), and including a third surface oriented in a third direction, and a fourth surface oriented in a fourth direction opposite the third direction, wherein the second housing is folded with respect to the first housing (e.g., the first housing structure 310) about the hinge structure (e.g., the hinge structure 510), a first display (e.g., the first display 501) visible through at least a portion of the first surface of the first housing (e.g., the first housing structure 310), a second display (e.g., the second display 502) extending from the second surface to the fourth surface across the hinge structure (e.g., the hinge structure 510), wherein at least a partial area of the second display corresponding to the hinge structure (e.g., the hinge structure 510) is flexible, and at least one processor (e.g., the processor 120). The at least one processor (e.g., the processor 120) may be configured to control, in the unfolded state, the second display (e.g., the second display 502) to display a second screen of a first application corresponding to the second display (e.g., the second display 502), control the first display (e.g., the first display 501) to display a transition screen based on detection of folding from the unfolded state to the folded state, and control the first display (e.g., the first display 501) to display the first screen in replacement of the transition screen when it is detected that execution of at least one operation set to be performed to display a first screen of the first application corresponding to the first display (e.g., the first display 501) is completed. In a folded state, the second surface may face the fourth surface, in an unfolded state, the third direction may be substantially the same as the first direction, in the folded state, a first area of the second display (e.g., the second display 502) may face a second area of the second display (e.g., the second display 502), and in the unfolded state, the first area may define substantially the same plane as the second area.

The electronic device (e.g., the electronic device 101) according to various embodiments may be one of various types of electronic devices. The electronic devices (e.g., the electronic device 101) may include, for example, a computer device, a portable communication device (e.g., a smartphone), a portable multimedia device, a portable medical device, a camera, a wearable device, or a home appliance. According to an embodiment of the disclosure, the electronic devices (e.g., the electronic device 101) are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., a master device or a task performing device). For example, a processor (e.g., the processor 120) of the machine e.g., a master device or a task performing device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A portable communication device comprising:
   a housing comprising a first housing structure, a first rear cover, a second housing structure, and a second rear cover, wherein the second housing structure is rotatable with respect to the first housing structure such that the housing is movable between a folded state and an unfolded state, and wherein at least part of the first housing structure and at least part of the second housing structure face to each other while the housing is in the folded state;
   a first display having a first resolution and a first size, and viewable through an area of the first rear cover;
   a second display separate from the first display having a second resolution higher than the first resolution and a second size larger than the first size, and being accommodated by the first housing structure and the second housing structure to be viewed when the housing is in the unfolded state;
   at least one processor; and
   a memory storing instructions which, when executed by the at least one processor, cause the portable communication device to:

display, through the first display, a first screen of an application which has the first resolution and the first size, while the housing is in the folded state, based on the housing being changed from the folded state to the unfolded state:

display, through the second display as a transition image, an enlarged image of at least a portion of the first screen which was displayed through the first display before being changed to the unfolded state, and after the enlarged image is displayed, replacing, on the second display, the enlarged image with a second screen of the application which has the second resolution and the second size corresponding to the second display, wherein the second screen is different from the first screen.

2. The portable communication device of claim 1, wherein the instructions, when executed by the at least one processor, causes the portable communication device to capture the first screen which was displayed through the first display before being changed to the unfolded state, and wherein the enlarged image displayed through the second display is obtained based on the captured first screen.

3. The portable communication device of claim 2, wherein the captured first screen has the first resolution and the second screen, replacing the enlarged image, has the second resolution.

4. The portable communication device of claim 1, wherein the second screen includes a first content contained in the first screen and a second content omitted in the first screen.

5. The portable communication device of claim 1, wherein the instructions, when executed by the at least one processor, causes the portable communication device to:

as at least part of the replacing of the enlarged image with the second screen, display a redrawing result of the first screen having the first size and the first resolution, as the second screen.

6. The portable communication device of claim 5, wherein the instructions, when executed by the at least one processor, causes the portable communication device to:

perform redrawing of the first screen for the second display to obtain the second screen, wherein the performing of redrawing of the first screen and the displaying of the enlarged image are performed in parallel.

7. The portable communication device of claim 1, wherein the instructions, when executed by the at least one processor, causes the portable communication device to:

as at least part of the displaying of the enlarged image, turn on the second display which was turned off before being changed to the unfolded state and display the enlarged image as an initial screen of the second display after the second display is turned on.

8. An operating method of a portable communication device comprising:

displaying, through a first display of the portable communication device, a first screen of an application which has a first resolution and a first size, while a housing of the portable communication device is in a folded state, based on the housing being changed from the folded state to an unfolded state:

displaying, through a second display of the portable communication device that is separate from the first display, an enlarged image of at least a portion of the first screen which was displayed through the first display before being changed to the unfolded state, as a transition screen, and after the enlarged image is displayed, replacing, on the second display, the enlarged image with a second screen of the application which has a second resolution higher than the first resolution and a second size larger than the first size corresponding to the second display, wherein the second screen is different from the first screen.

9. The operating method of claim 8, further comprising:

capturing the first screen which was displayed through the first display before being changed to the unfolded state, and wherein the enlarged image displayed through the second display is obtained based on the captured first screen.

10. The operating method of claim 9, wherein the captured first screen has the first resolution and the second screen, replacing the enlarged image, has the second resolution.

11. The operating method of claim 8, wherein the second screen includes a first content contained in the first screen and a second content omitted in the first screen.

12. The operating method of claim 8, wherein the replacing of the enlarged image with the second screen comprises displaying a redrawing result of the first screen having the first size and the first resolution, as the second screen.

13. The operating method of claim 12, further comprising:

performing redrawing of the first screen for the second display to obtain the second screen, wherein the performing of redrawing of the first screen and the displaying of the enlarged image are performed in parallel.

14. The operating method of claim 8, wherein the displaying of the enlarged image comprises turning on the second display which was turned off before being changed to the unfolded state and displaying the enlarged image as an initial screen of the second display after the second display is turned on.

* * * * *